(12) United States Patent
Vanderbeken

(10) Patent No.: US 7,866,196 B2
(45) Date of Patent: Jan. 11, 2011

(54) TANK WALL AND METHOD AND SYSTEM FOR MAKING

(75) Inventor: Mark Vanderbeken, White Rock (CA)

(73) Assignee: Cobra Tanks, Inc. (CA)

( * ) Notice: Subject to any disclaimer, the term of this patent is extended or adjusted under 35 U.S.C. 154(b) by 200 days.

(21) Appl. No.: 10/599,876

(22) PCT Filed: Apr. 7, 2005

(86) PCT No.: PCT/CA2005/000534

§ 371 (c)(1),
(2), (4) Date: Jul. 12, 2007

(87) PCT Pub. No.: WO2005/097374

PCT Pub. Date: Oct. 20, 2005

(65) Prior Publication Data

US 2007/0261455 A1    Nov. 15, 2007

Related U.S. Application Data

(60) Provisional application No. 60/560,981, filed on Apr. 12, 2004.

(51) Int. Cl.
*B21C 37/12* (2006.01)
*B21C 37/06* (2006.01)
(52) U.S. Cl. .............................. 72/50; 72/368; 72/379.4
(58) Field of Classification Search ................ 72/49–50, 72/379.4, 367.1, 368; 228/17.7, 145; 29/429
See application file for complete search history.

(56) References Cited

U.S. PATENT DOCUMENTS

| 2,233,233 A | | 2/1941 | Williams |
| 2,751,672 A | | 6/1956 | Reed |
| 2,986,193 A | | 5/1961 | Howell |
| 3,838,496 A | * | 10/1974 | Kelly .......................... 228/213 |
| 3,863,479 A | | 2/1975 | Lipp |
| 4,074,847 A | | 2/1978 | McFatter |
| 4,121,747 A | | 10/1978 | McFatter |
| 6,000,261 A | * | 12/1999 | Johnston ........................ 72/49 |

FOREIGN PATENT DOCUMENTS

DE            19939180         * 2/2001

* cited by examiner

*Primary Examiner* — Dana Ross
*Assistant Examiner* — Mohammad Yusuf
(74) *Attorney, Agent, or Firm* — Vermette & Co.; Clifford W. Vermette; Denis R. O'Brien

(57) ABSTRACT

A method for manufacturing a circular metal tank, from an elongated sheet of metal. The upper and lower longitudinal edges of the metal sheet are bent to produce a first "L" bend and a second "chair" bend, respectively. The sheet of metal is moved in a helical trajectory such that the second bend comes into proximity above the first bend. The second bend and the first bend are welded together such that the wall of the cylindrical tank is formed. Welding of the bends serves to stress relieve or anneal the bent metal, thereby preventing cracks in the metal which may result in leaks and/or compromise the structural integrity of the tank. The first and second bends additionally cooperate to form a helical roller track on the outside of the tank. The tank is supported and rotated about its longitudinal axis on a plurality of rollers that engage the roller track.

22 Claims, 26 Drawing Sheets

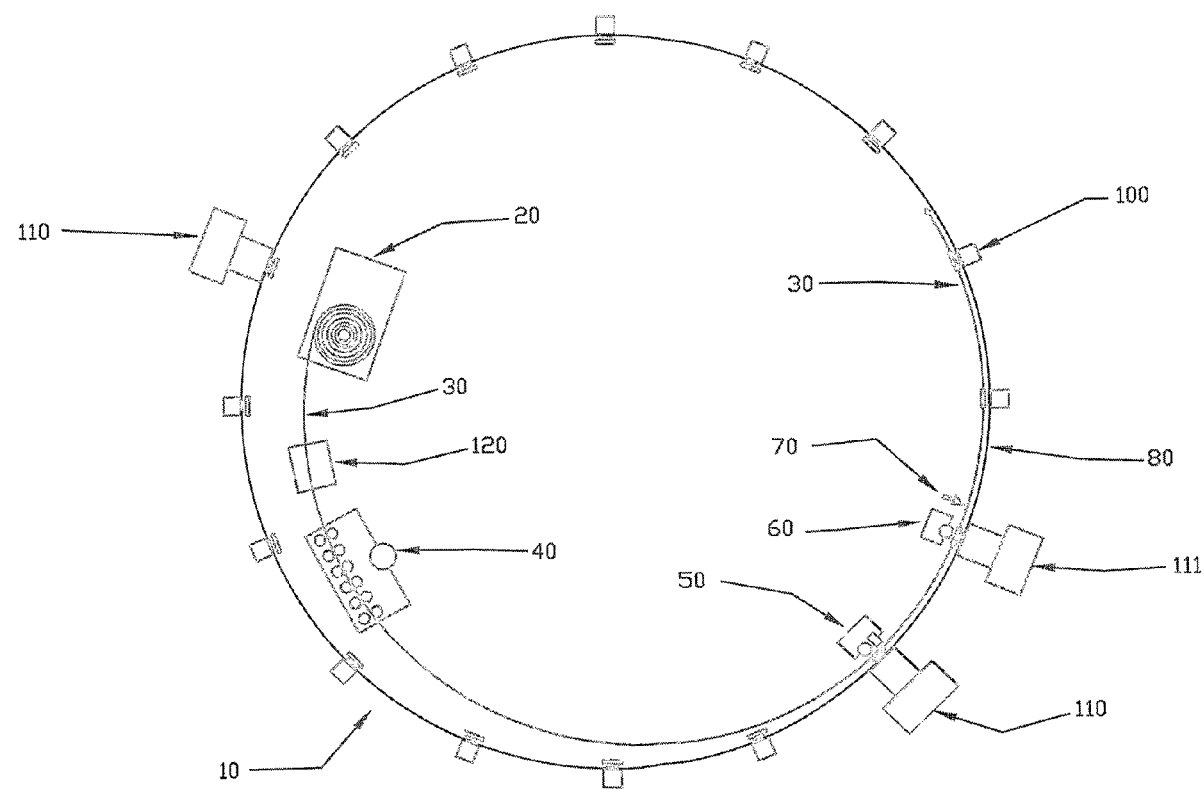

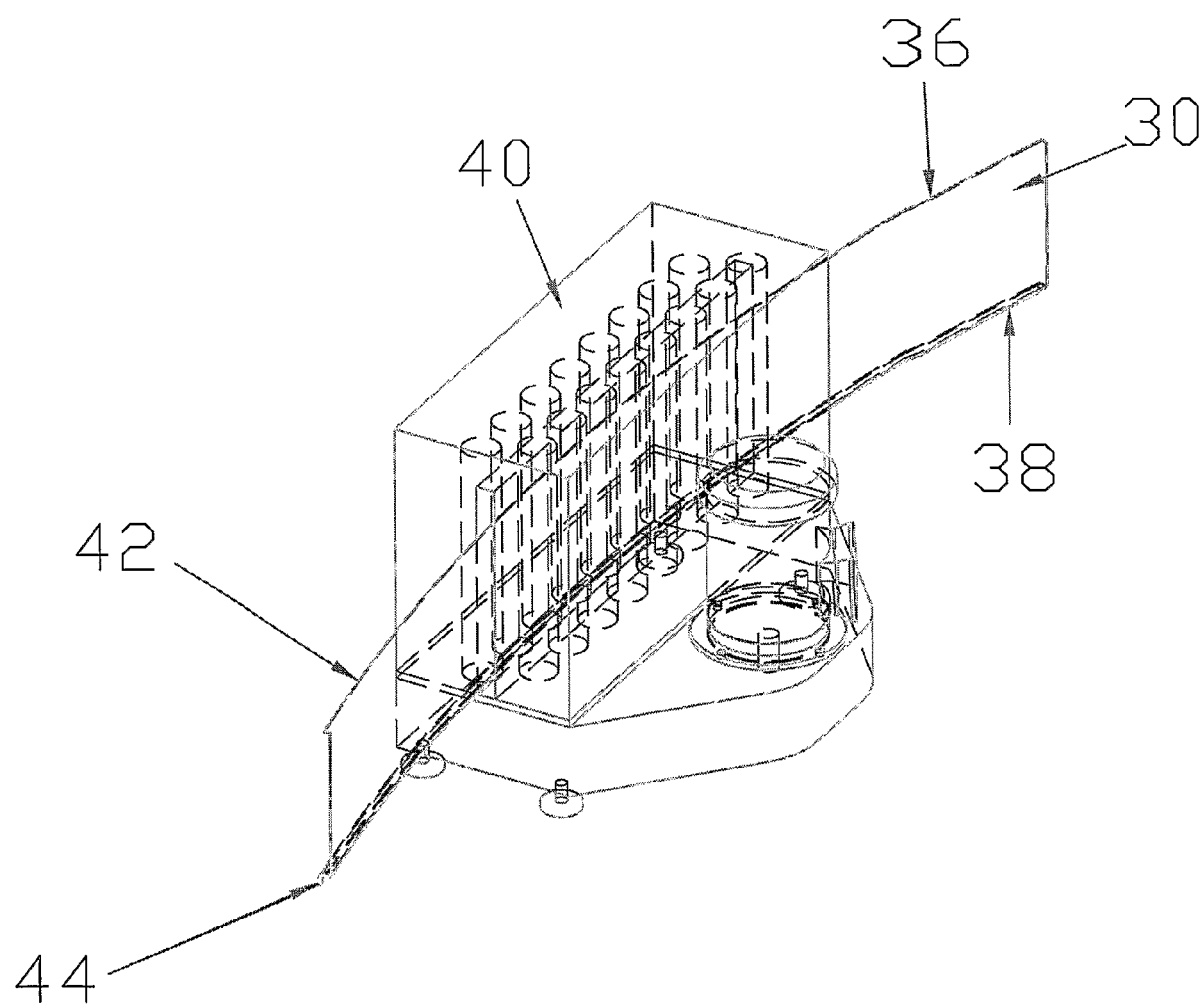

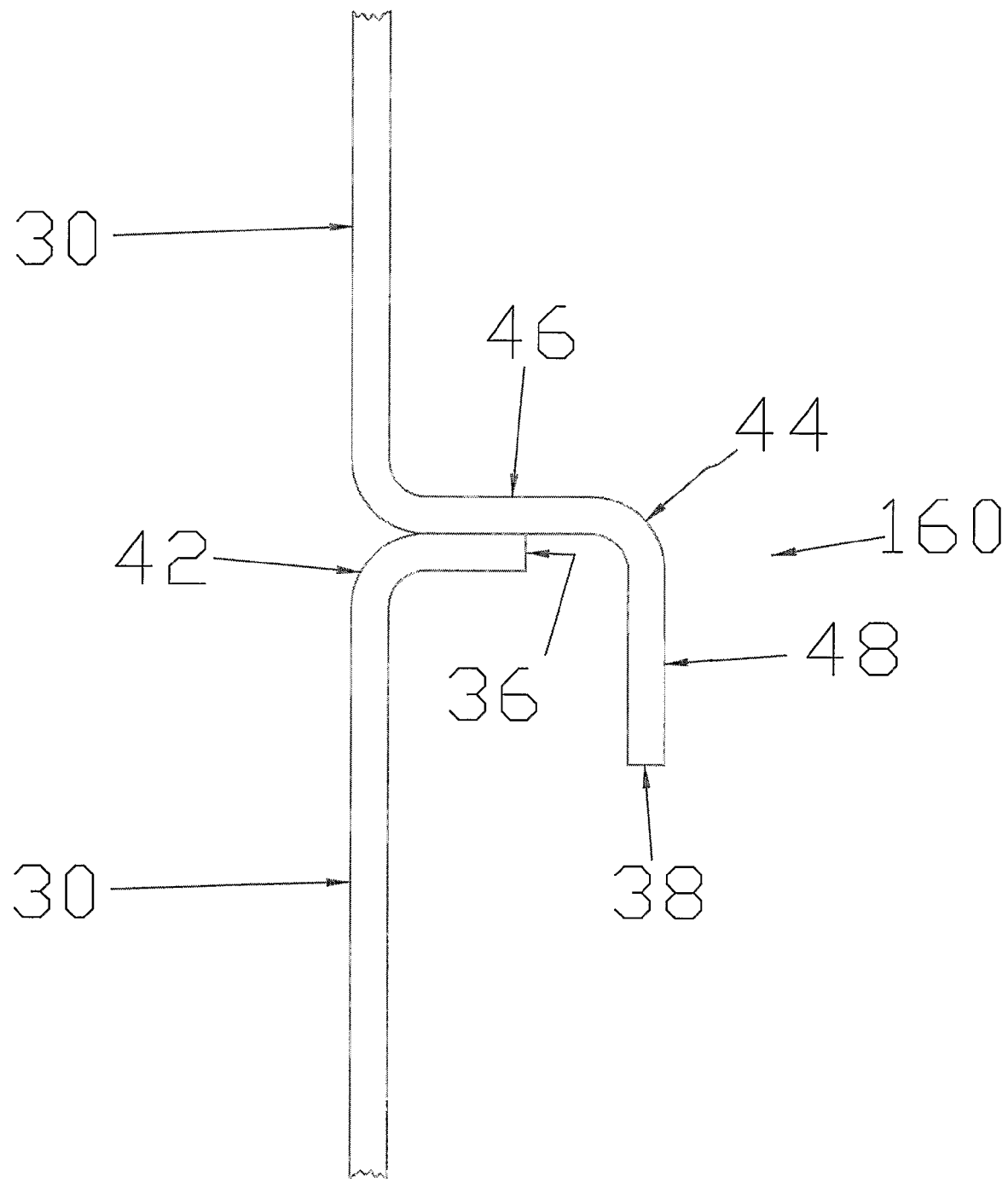

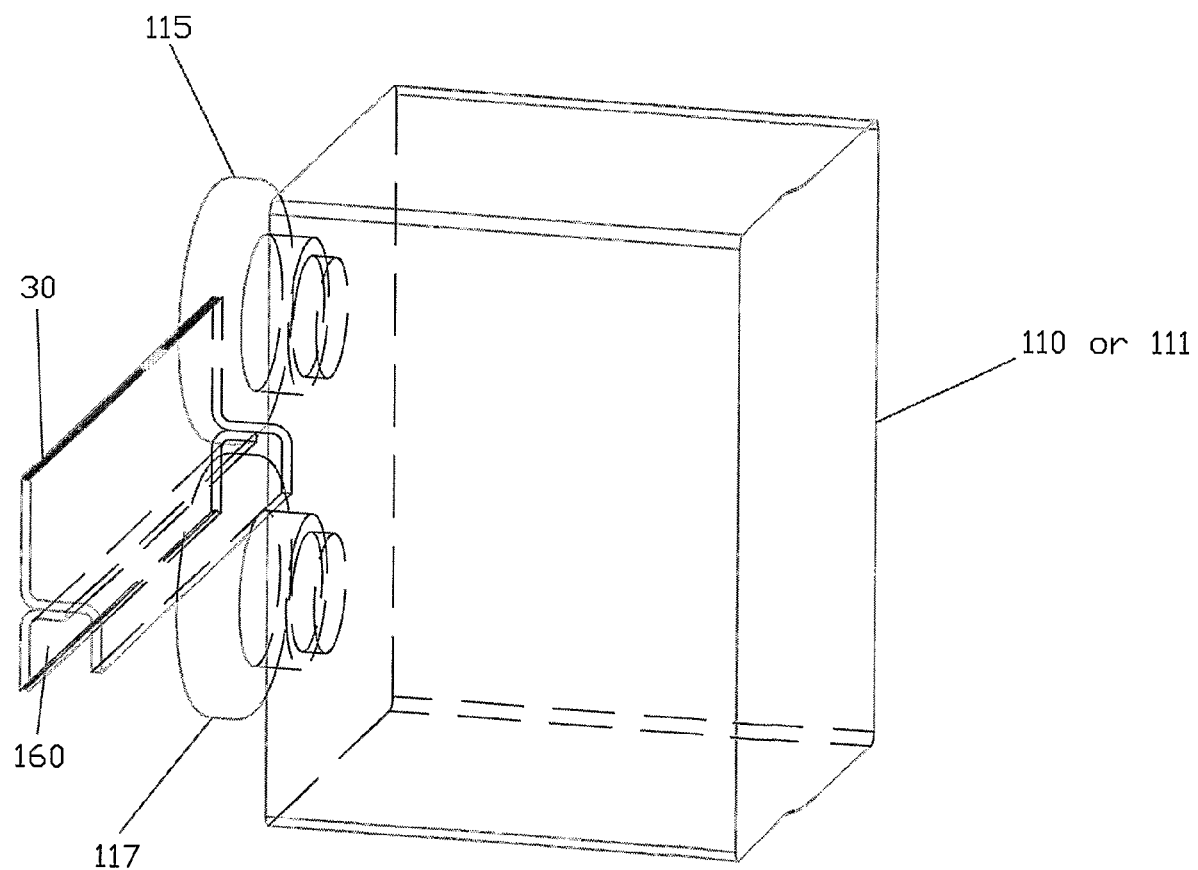

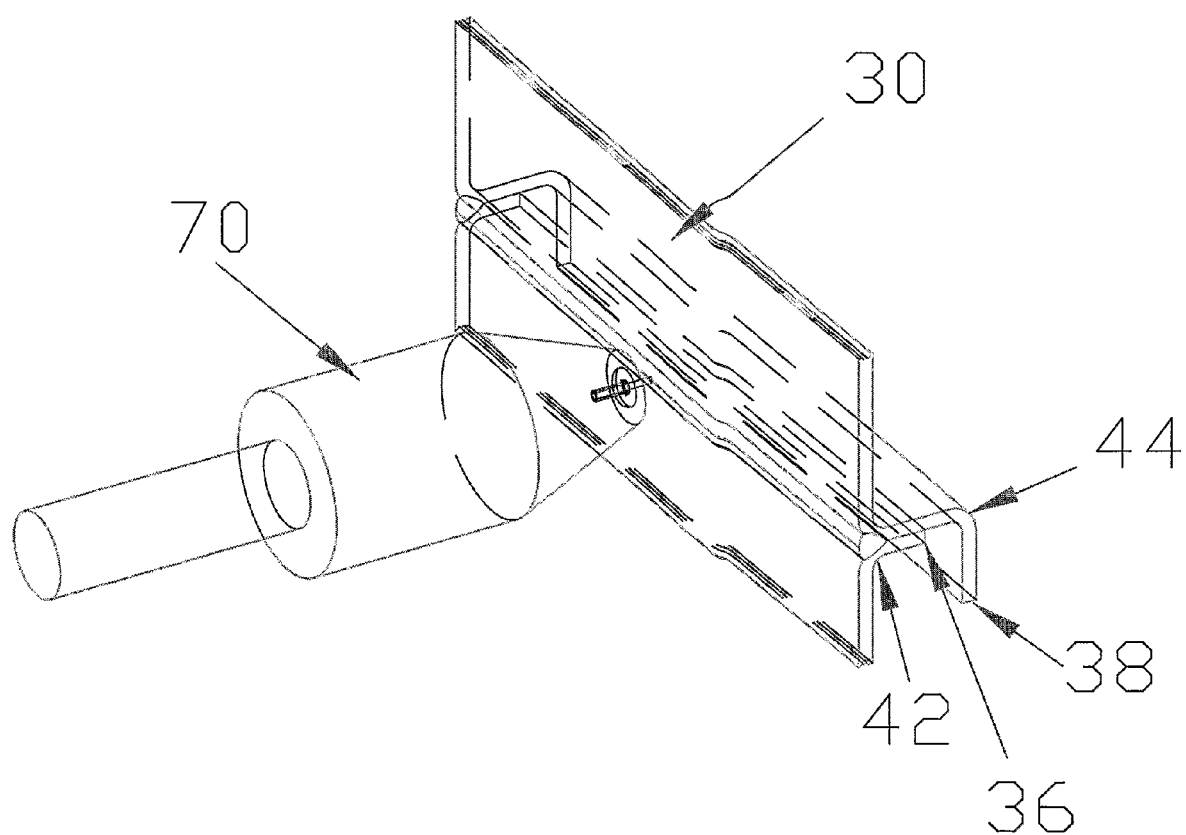

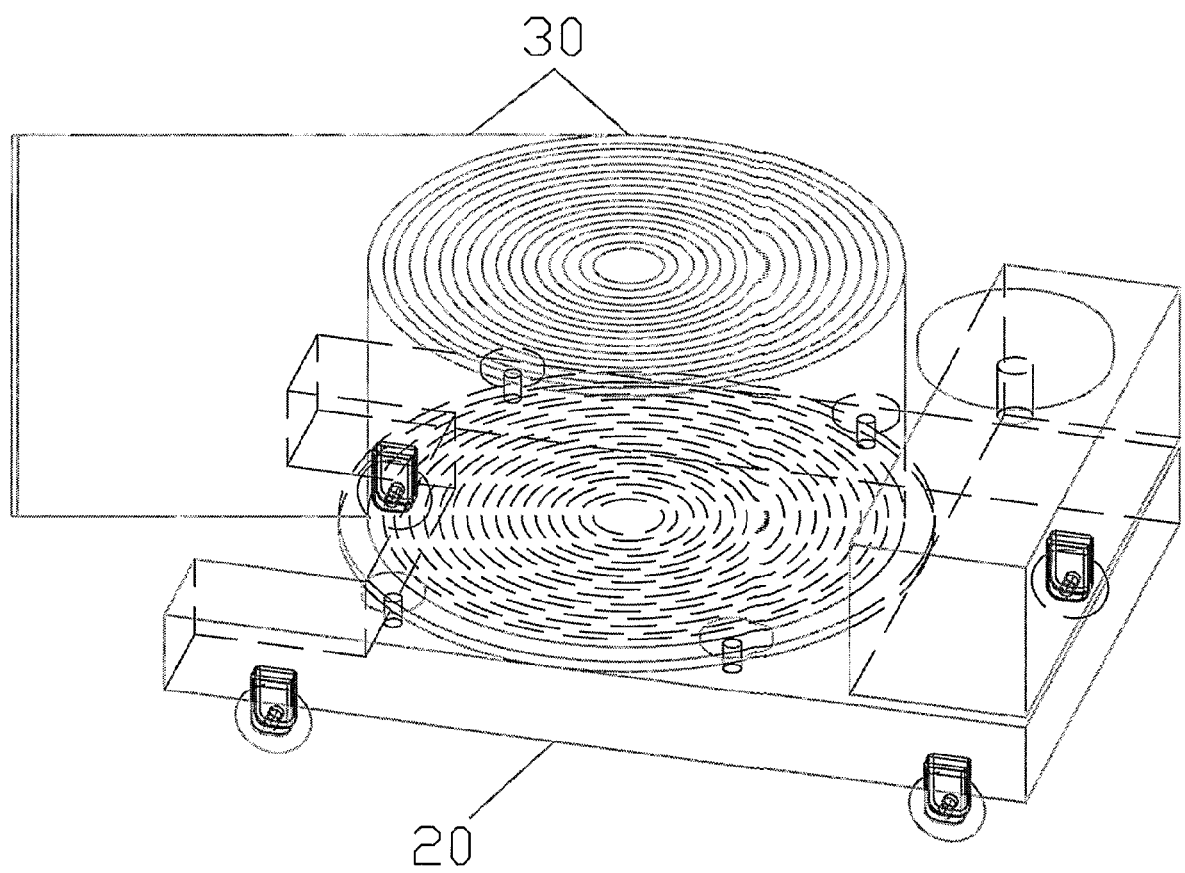

TANK WALL AND METHOD AND SYSTEM FOR MAKING

RELATED APPLICATIONS

This application claims the benefit of U.S. Provisional Patent Application 60/560,981, filed on Apr. 12, 2004.

FIELD OF THE INVENTION

This invention relates generally to the manufacture of circular metal tanks from steel coils shipped to site straight from the steel mill.

BACKGROUND OF THE INVENTION

The prior art describes a variety of methods for the construction of circular metal tanks used in storage of solids or liquids. For instance, U.S. Pat. No. 2,751,672, issued to Reed, describes the fabrication of circular tanks from a series of metal sheets which are bolted together. This method of assembly requires a large amount of manual labour, a complicated tank support structure, and is unsuitable for producing tanks for storage of liquids due to the massive number of bolt holes requiring hydraulic seals to prevent the leakage of any stored liquid.

U.S. Pat. No. 4,121,747, issued to McFatter, describes the construction of circular storage tanks from strip metal wound in a helical path in which the tank is built upwardly. The metal strip is fed to a support assembly arranged circularly on a base, and the upper edge of the strip that is fed to the support assembly is aligned with the lower edge of the helical turn immediately thereabove so that the edges are spaced apart in a vertical plane from each other and then "butt" welded together. This invention teaches away from the bending of metal strip edges and sees no potential advantage in doing so. This technique for tank fabrication suffers from the following disadvantages:

a) satisfactory alignment of metal strips ahead of a butt welder is difficult;
b) slight misalignment of the metal strips, especially for thinner metal thicknesses, can cause weak welds and/or leaks due to insufficient metal-to-metal contact; and
c) there is no provision for reinforcement of metal strips to prevent their deformation (e.g. bulging due to pressure on lower metal strips in a tall liquid storage tank.

U.S. Pat. No. 3,863,479 to Lipp describes the fabrication of metal tubes and tanks from helical metal coils using severe folded bends from adjacent coils. Lipp suffers from the following disadvantages:

a) the tanks are unsuitable for storage of liquids since perfect hydraulic seals at the mechanical bends cannot be guaranteed;
b) the method is unsuitable for hard-to-bend metals, especially for higher carbon steels, due to the severity of the bends and lack of stress relief (e.g. annealing) after bending resulting in potential metal cracking and subsequent loss of strength and hydraulic seals;
c) the thickness of usable metal is limited due to the severity of the bends, which may result in cracking and subsequent loss of strength and hydraulic seals; and
d) there are no reinforcing corrugations in the coils to prevent bulging, which is especially problematic since the thickness of the metal that may be used is limited, as discussed in point (c) above.

SUMMARY OF THE INVENTION

The invention relates to a method for manufacturing a circular metal tank, from an elongated sheet of metal. The upper and lower longitudinal edges of the metal sheet are bent to produce a first "L" bend and a second "chair" bend, respectively. The sheet of metal is moved in a helical trajectory such that the second bend comes into proximity above the first bend. The second bend and the first bend are welded together such that the wall of the cylindrical tank is formed. The first and second bends cooperate to form a helical roller track on the outside of the tank. The tank is supported and rotated about its longitudinal axis on a plurality of rollers that engage the roller track. As the tank is rotated and the metal sheet is welded to the bottom thereof, the tank moves upwards on said rollers.

The metal sheet can optionally be corrugated to reinforce the walls of the tank and to prevent bulging.

The bending of the longitudinal edges of the metal sheet achieves the following:
  easier alignment of adjacent portions of the metal sheet which results in stronger welds and therefore improved hydraulic seals and increased structural strength;
  the first and second bends cooperate to form roller tracks that allow the tank to be supported and positioned on rollers as the tank is being manufactured;
  the bends themselves also act to reinforce the tank walls;
  welding of the bends serves to stress relieve or anneal the bent metal, thereby preventing cracks in the metal which may result in leaks and/or compromise the structural integrity of the tank.

BRIEF DESCRIPTION OF THE DRAWINGS

The invention itself both as to organization and method of operation, as well as additional objects and advantages thereof, will become readily apparent from the following detailed description when read in connection with the accompanying drawings, wherein:

FIG. 1b show a medium size circular tank production system according to the present invention;

FIGS. 3a, 3b & 3c show a bender/corrugator;

FIGS. 6a & 6b show a roller track formed by adjacent unwelded second and first bends of the metal strip;

FIG. 7 shows a roller track formed by adjacent second and first bends of the metal strip in combination with a double roller with adjustable bottom wheel;

FIGS. 9a & 9b show a welder;

FIG. 13 shows a decoiler assembly; and

DETAILED DESCRIPTION OF INVENTION

Figure 1A:
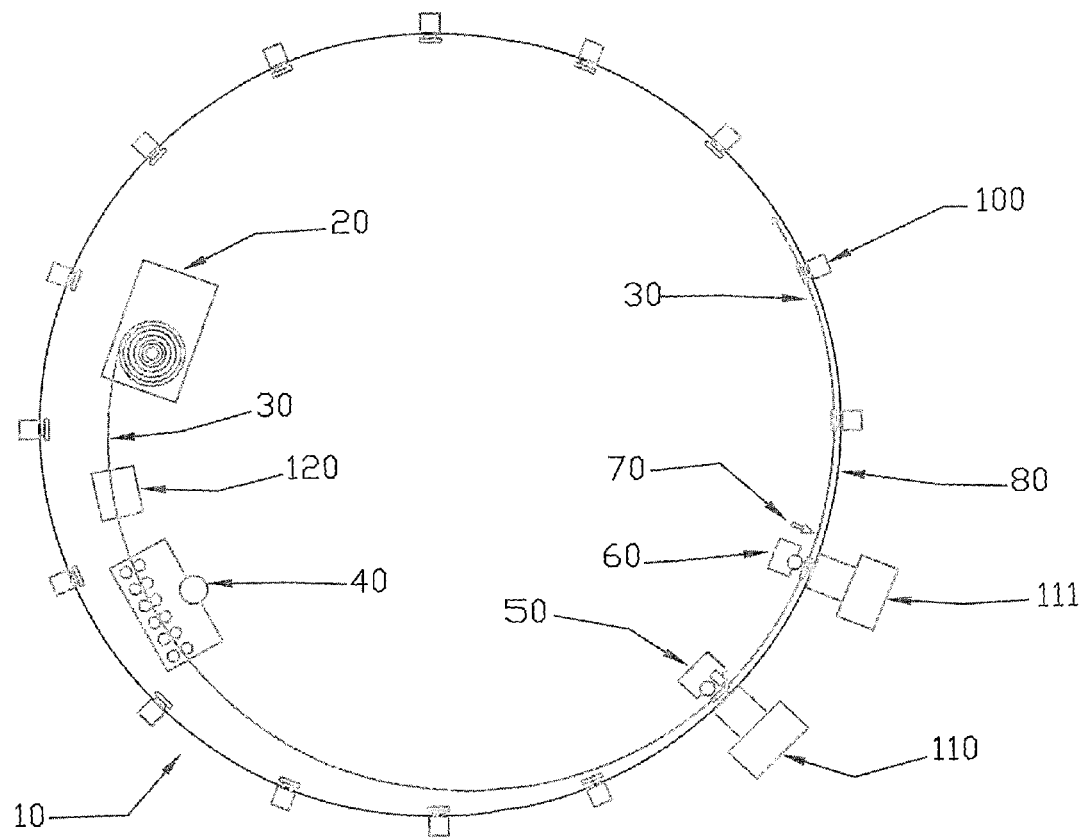
FIG. 1a shows a small circular tank production system according to the present invention.
Figure 1C:
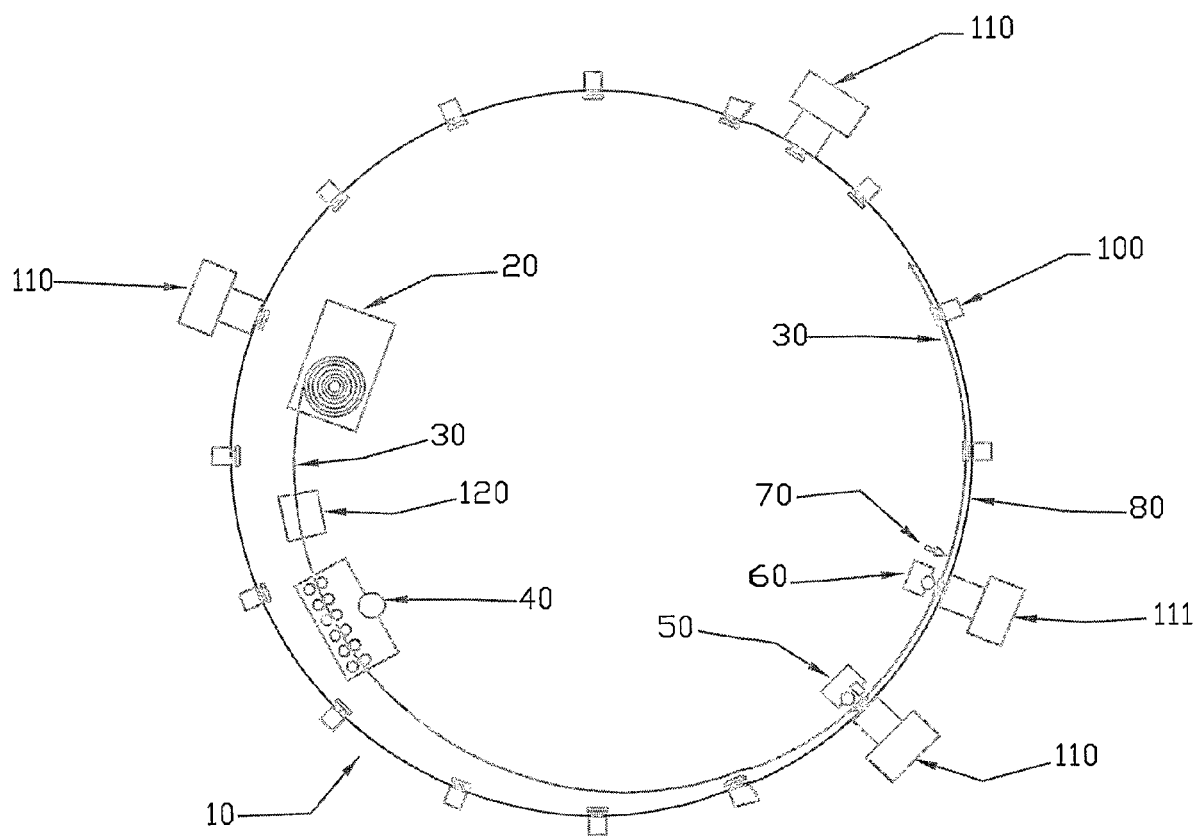
FIG. 1c shows a large size circular tank production system according to the present invention.

FIGS. 1a, 1b & 1c show a top view of the cylindrical tank 10 being constructed according to the present invention. The major components are identified as follows:

The Decoiler 20 unravels a coiled metal sheet 30 and feeds it into a Bender/Corrugator 40.

The Bender/Corrugator 40 creates first and second bends to the longitudinal edges of the metal sheet and optionally imparts single or multiple waveform reinforcing corrugations along the length of the decoiled metal sheet 30.

Welding Pre-aligner 50 "gross" positions adjacent edges of metal sheet 30 after it exits the Bender/Corrugator 40 and ahead of the Welding Positioner 60.

Welding Positioner 60 "fine" positions adjacent edges of the metal sheet 30 after it exits the Welding Pre-Aligner 50 and before it enters the Welder Assembly 70.

Welder Assembly 70 welds (e.g. by fillet weld) adjacent edges of the metal sheet 30.

Support System 80 which is a structure having rollers and positioners (e.g. Welding Pre-aligner 50 and Welding Positioner 60) that guide and support the metal sheet 30, before and after it is welded, along a helical trajectory.

Single Rollers 100 make up part of the Support System 80. They may be motorized or un-motorized rollers and operate to support and position the metal sheet 30 that forms the wall of the tank 10 while it is being constructed.

Motorized or un-motorized double rollers 110 and motorized double rollers 111 also make up part of the Support System 80. Double rollers 110 & 111 operate to support and position the metal sheet 30 that forms the wall of the tank 10 while it is being constructed.

Vertical Coil Seam Welder 120 may be manual or automatic and is operative to join (e.g. butt weld) adjacent ends of metal sheets 30 in order to connect two consecutive metal sheets 30.

Figure 2:
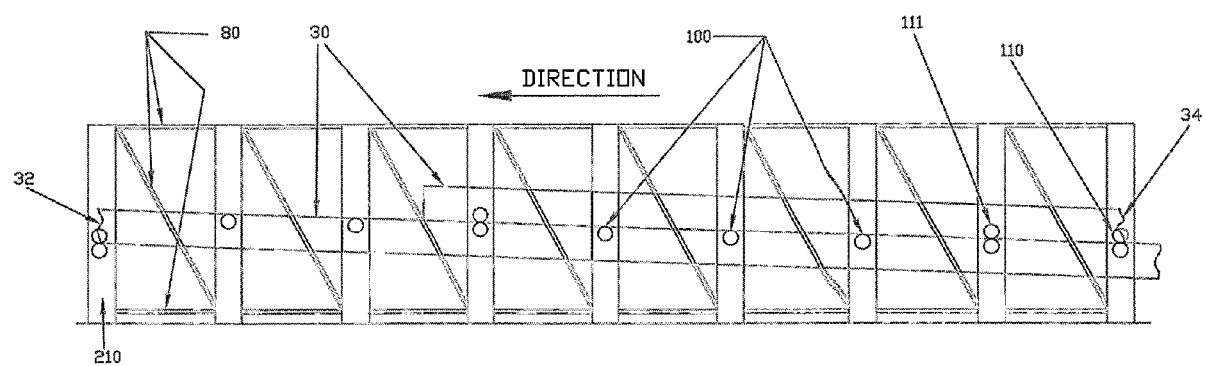
FIG. 2 shows inclined adjacent loops of the metal strip supported on rollers.

FIG. 2 illustrates a typical sequence of single rollers 100 and double rollers 110 & 111 showing adjacent portions of the metal sheet 30 inclined so that the sheet 30 follows a helical path. The image of FIG. 2 is drawn as if it they were flat and unwound (e.g. "Mercator" projection) seen from the interior view. The ends 32 and 34 of the metal sheet 30 are connected to one another although they appear on opposite sides of the Figure.

FIG. 3a illustrates a bender/corrugator 40 which creates a first "L" bend 42 along the upper longitudinal edge 36 and a second "chair" bend 44 along the lower longitudinal edge 38 of the metal sheet 30. In the preferred embodiment of the invention the first bend 42 forms what will be termed in the document an L-shaped bend with an angle of between 45 and 135 degrees with the metal sheet 30 and has a width of between 5 and 100 mm, (depending on the thickness of the metal, the type of metal, and the size of the tank 10). In the preferred embodiment the second bend 44 has a horizontal portion 46 that is between 5 and 100 mm wide and a vertical portion 48 that is between 5 and 150 mm.

Figure 3B:
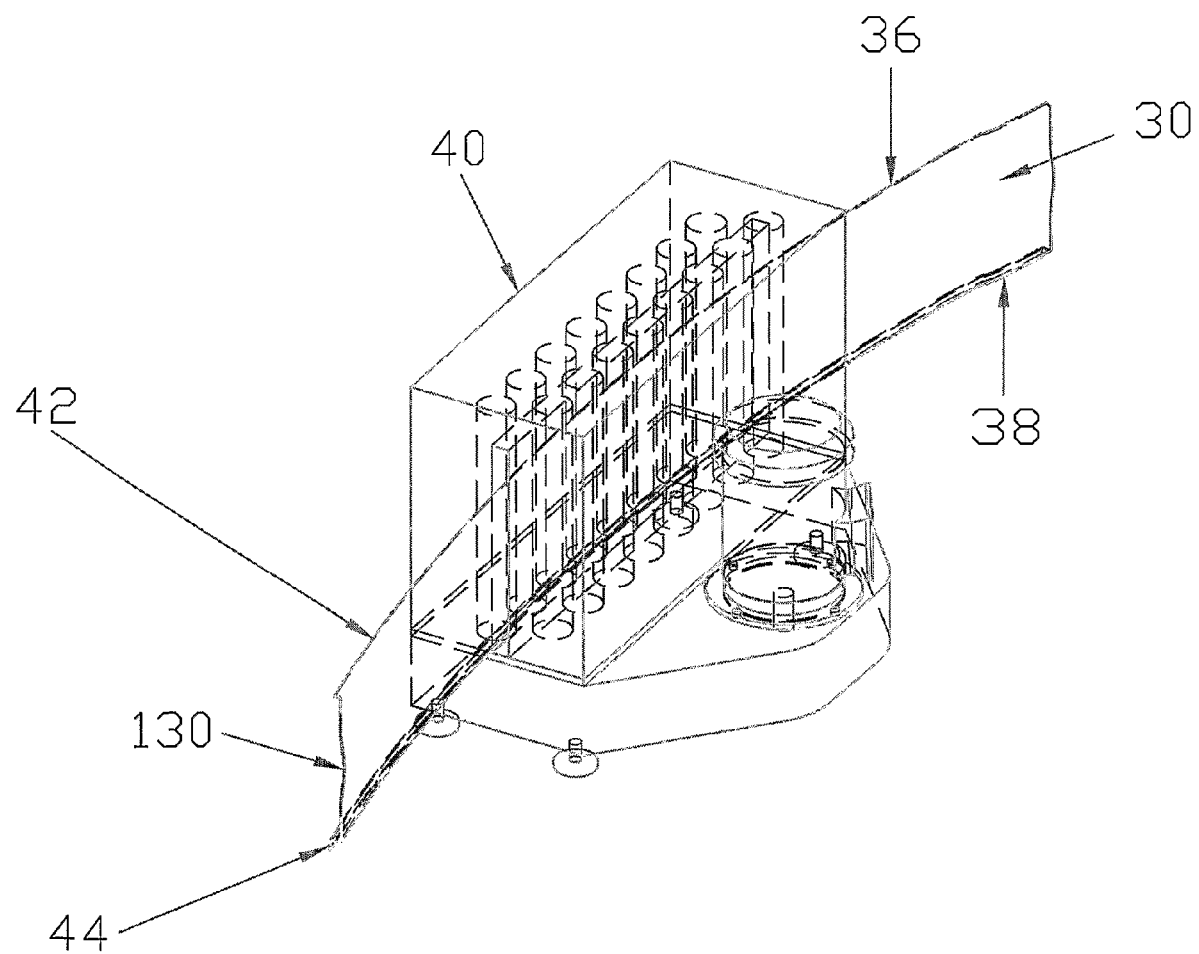

FIG. 3b illustrates a bender/corrugator 40 which creates a first "L" bend along the upper longitudinal edge 36 and a second "chair" bend along the lower longitudinal edge 38 plus a single corrugated bend 130 on the metal sheet 30.

Figure 3C:
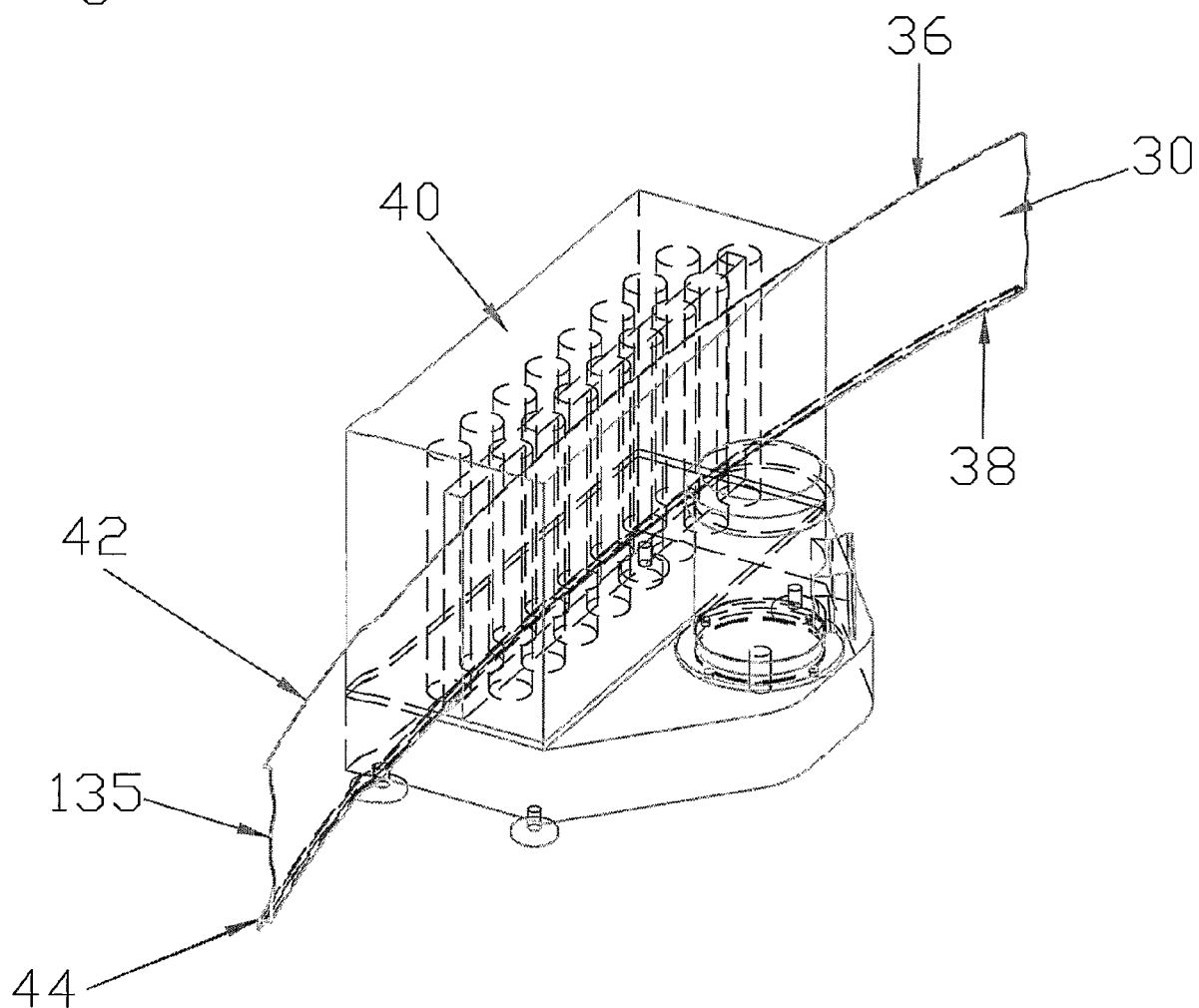

FIG. 3c illustrates a bender/corrugator 40 which creates a first "L" bend along the upper longitudinal edge 36 and a second "chair" bend along the lower longitudinal edge 38 plus a double corrugated bend 135 on the metal sheet 30.

Figure 4A:
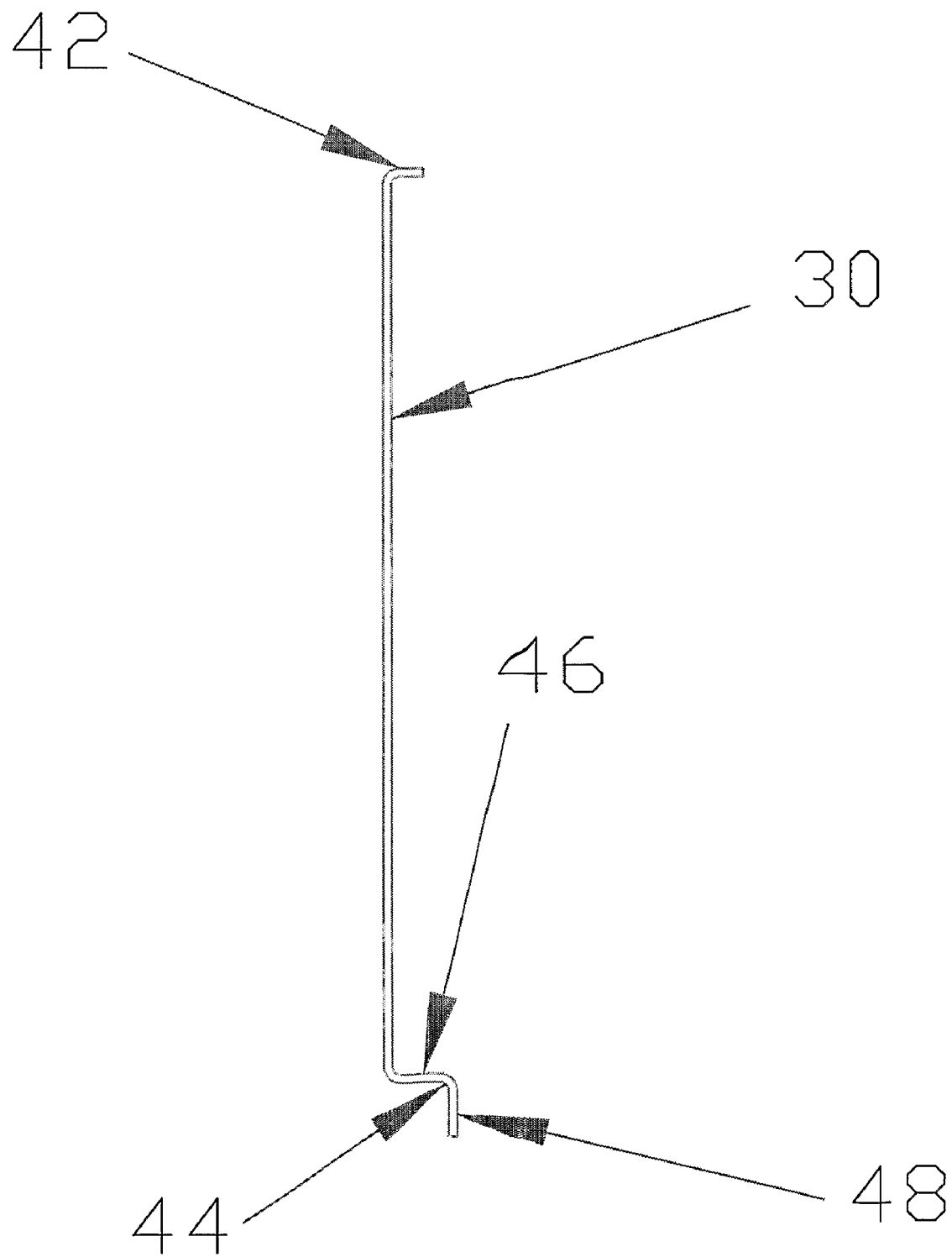
FIGS. 4a, 4b & 4c show cross sections of alternate embodiments of the metal strip after it has been bent and/or corrugated.

FIG. 4a illustrates the cross section of the metal sheet 30 after it is output from the FIG. 3a bender/corrugator 40.

Figure 4B:
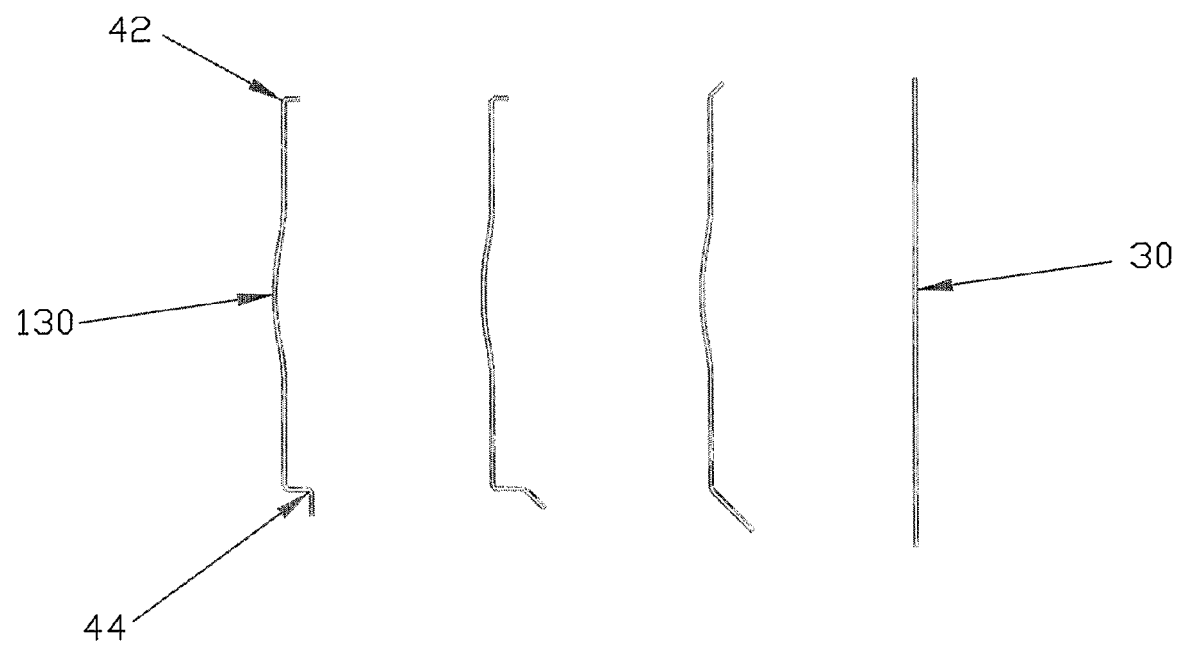

FIG. 4b illustrates the cross sections of the metal sheet 30 at various stages as it passes through the bender/corrugator 40 of FIG. 3b.

Figure 4C:
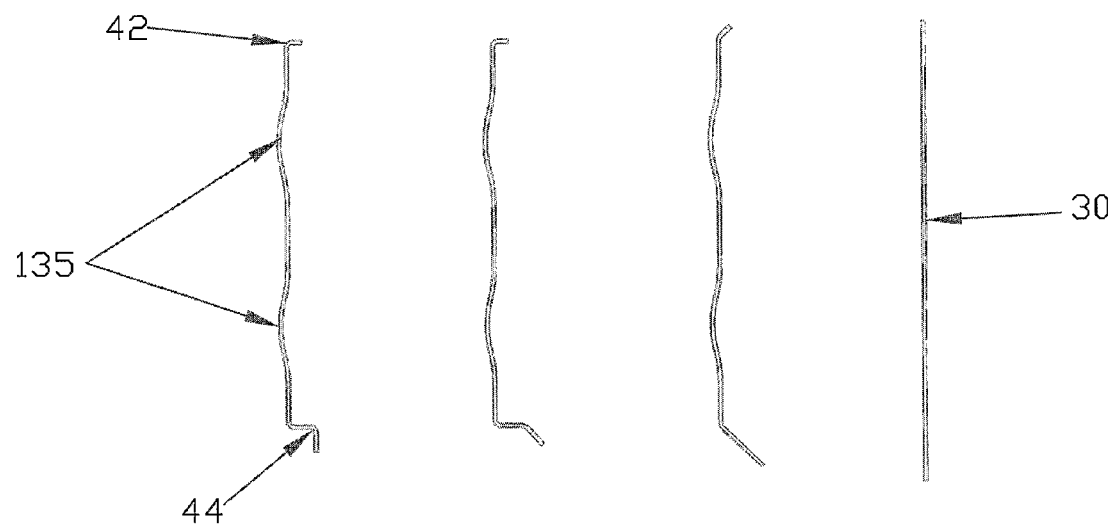

FIG. 4c illustrates the cross sections of the metal sheet 30 at various stages as it passes through the bender/corrugator 40 of FIG. 3c.

Figure 5A:
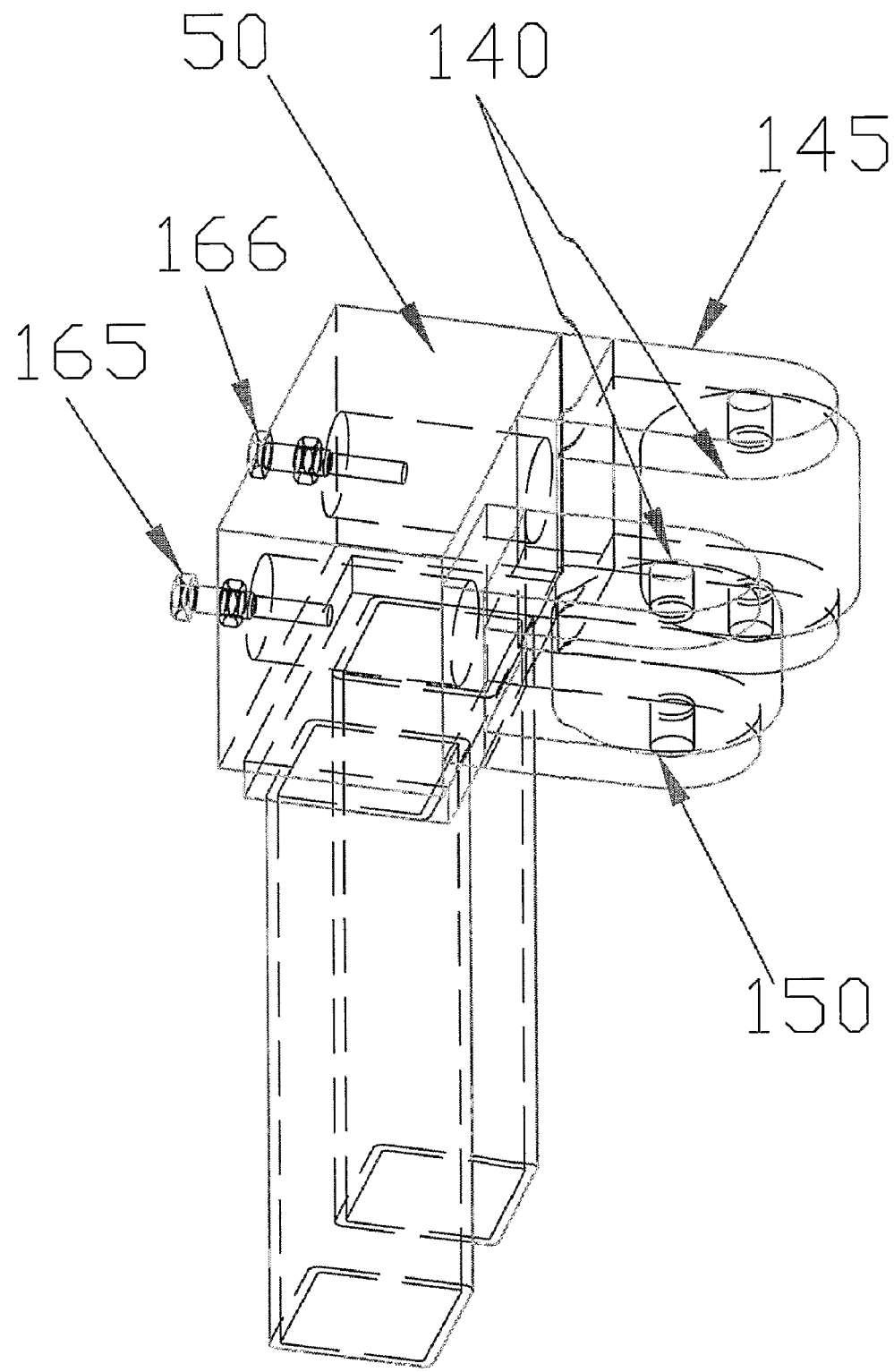
FIG. 5a shows a welding pre-aligner.

FIG. 5a illustrates the welding pre-aligner 50, which is operative to gross position adjacent edges of the metal sheet 30. The pre-aligner 50 has horizontal adjustable rollers 140—roller 150 pushes the upper edge 36 of the lower unwelded part of the metal sheet 30 (not shown) in the exterior direction (i.e. from the inside of the tank 10 towards the outside) whereas roller 145 pushes both the upper edge 36 of the lower part of the metal sheet 30 and the lower edge 38 of the upper part of the metal sheet 30 in the exterior direction. The pre-aligner 50 additionally has horizontal roller adjustors 165 and 166 to regulate the horizontal positioning of rollers 145 and 150. The pre-aligner 50 operates in conjunction with a double roller 110 described in more detail below.

Figure 5B:
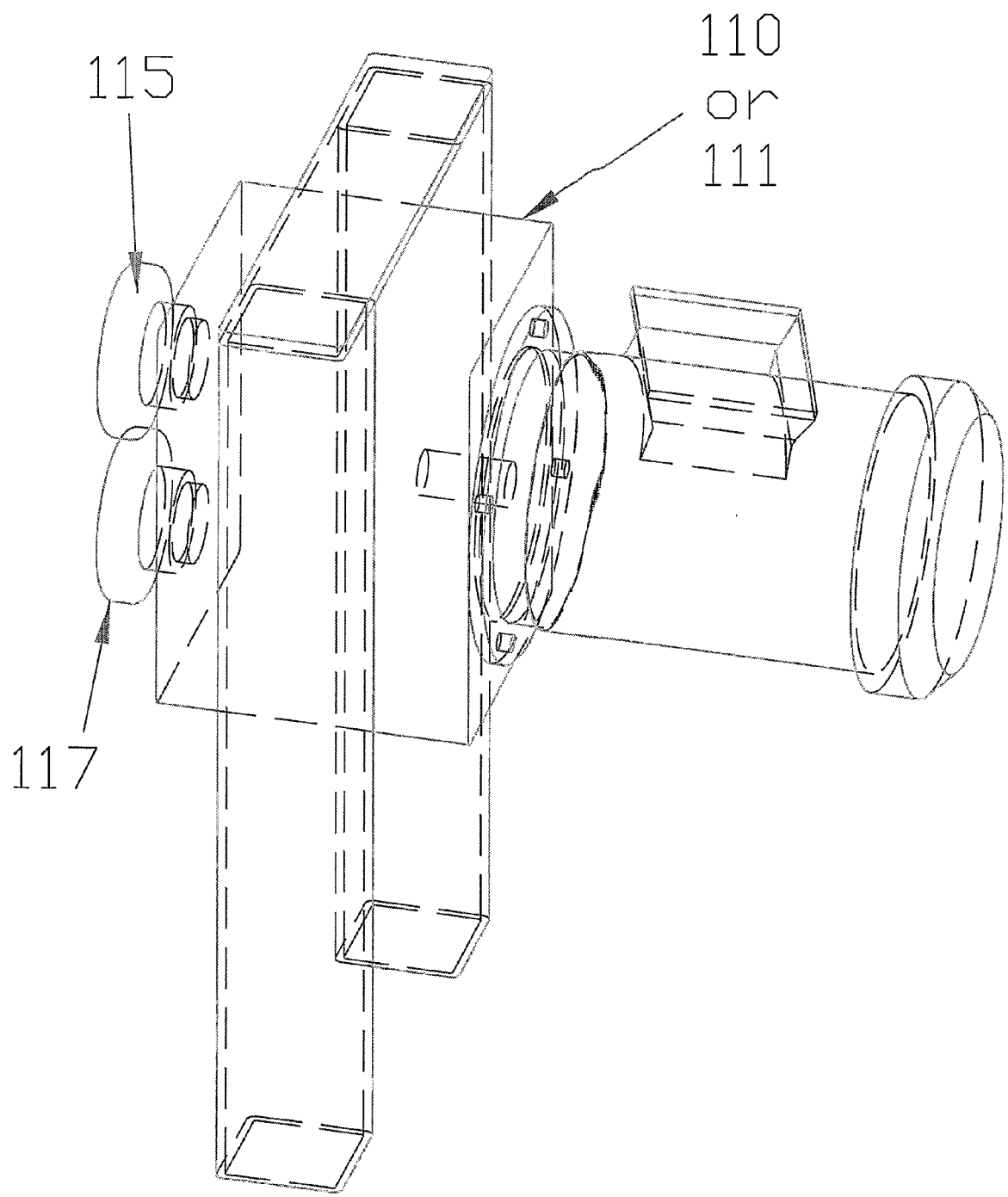
FIG. 5b shows a motorized double roller with adjustable top wheel.

FIG. 5b, shows double roller 110 in isolation. The double roller 110 may be used alone or as part of a welding pre-aligner 50. The double rollers are also used at other points during the construction of the tank 10, as shown in FIGS. 1 and 2. Generally, the double rollers 110 may be motorized or free-rolling. In the preferred embodiment of the present invention the double rollers 110 of the welding pre-aligner 50 and the double rollers 111 of the welding positioner 60 are motorized to aid in the accurate positioning and welding of the metal sheet 30. In addition, in the embodiment in FIG. 5b, the double roller 110 has rollers 115 and 117 that are adjustable. Rollers 115 and 117 can be simultaneously horizontally adjusted while the upper roller 115 can also be vertically adjusted upwards or downwards.

Figure 6B:
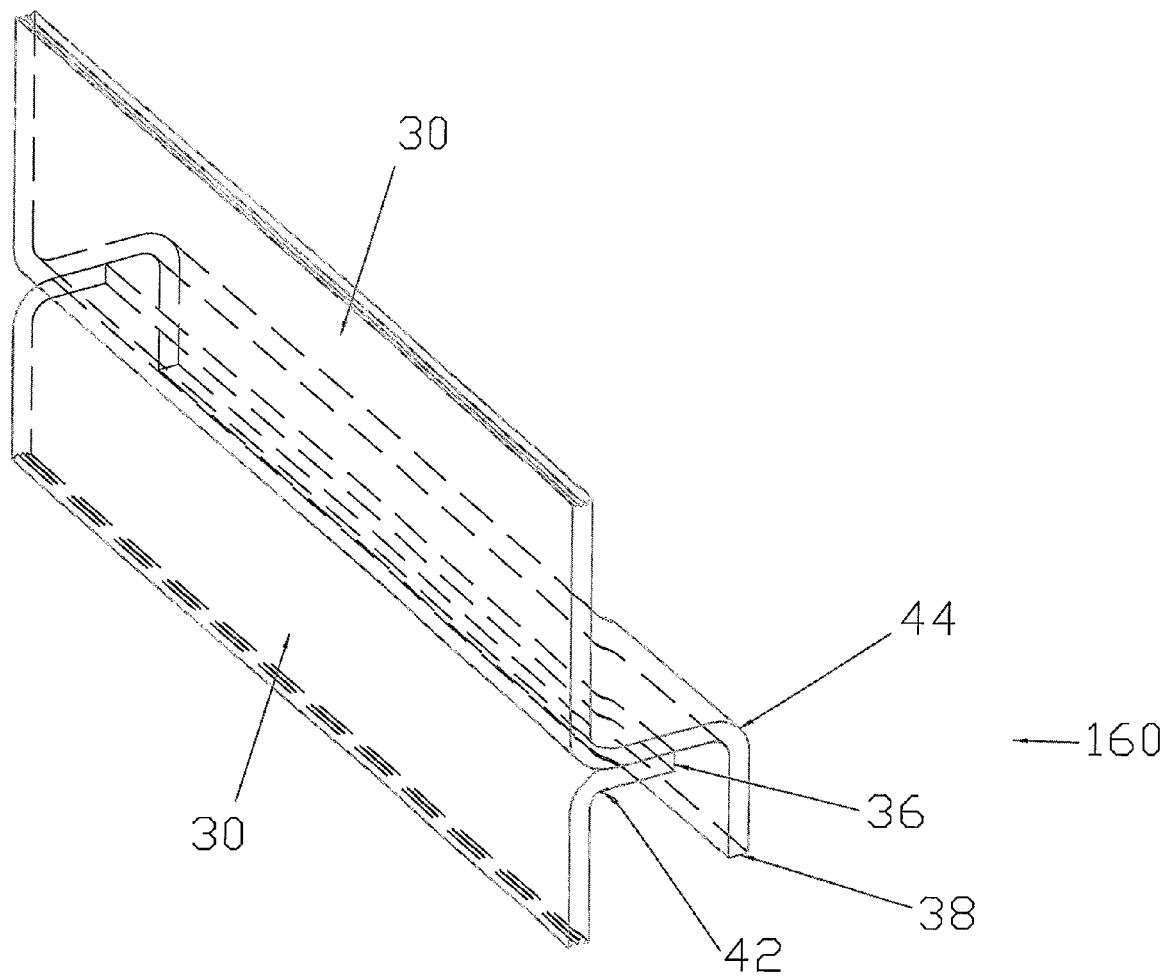
Figure 11A:
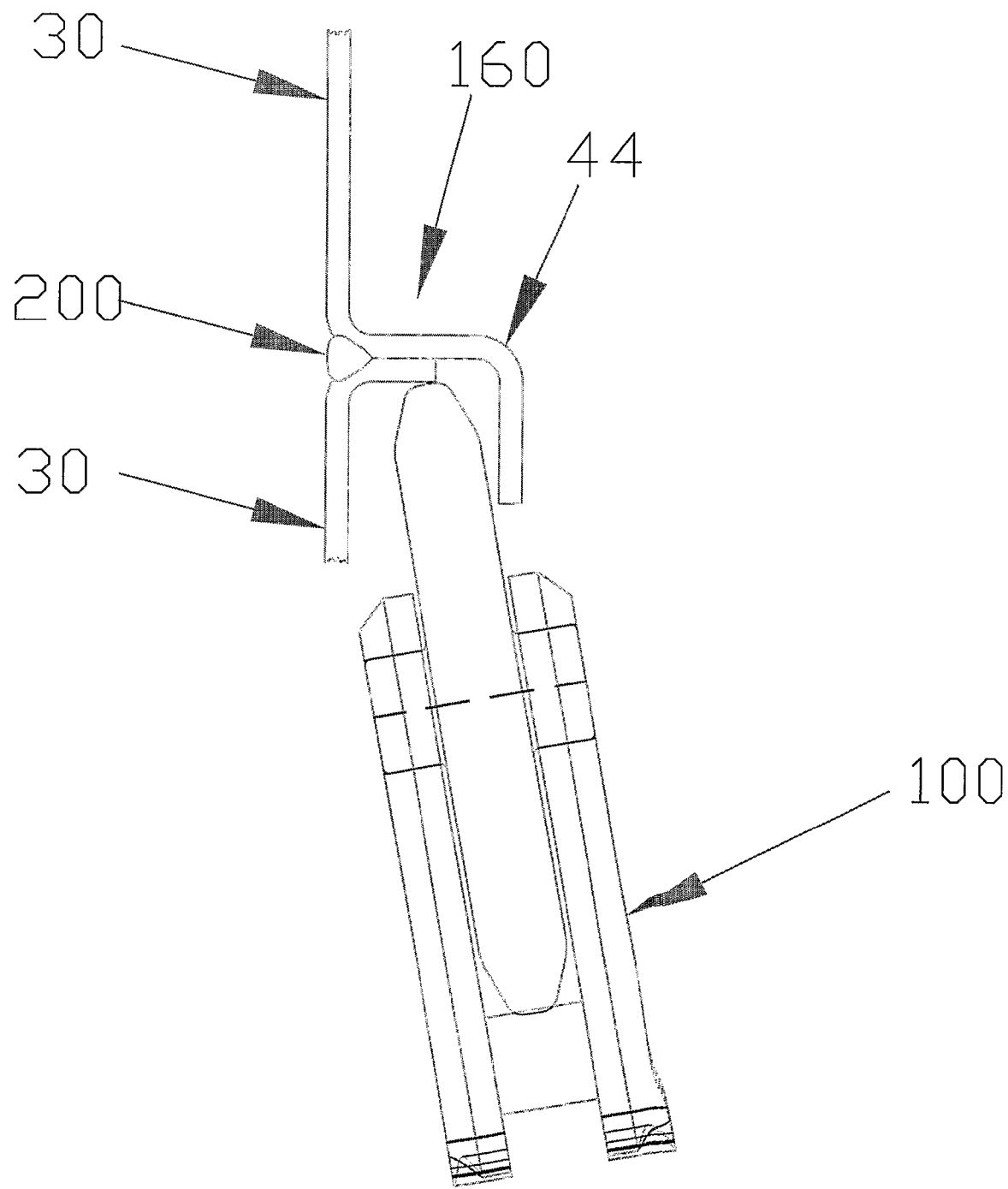
FIGS. 11a & 11b show a roller track engaged by a single roller.
Figure 11B:
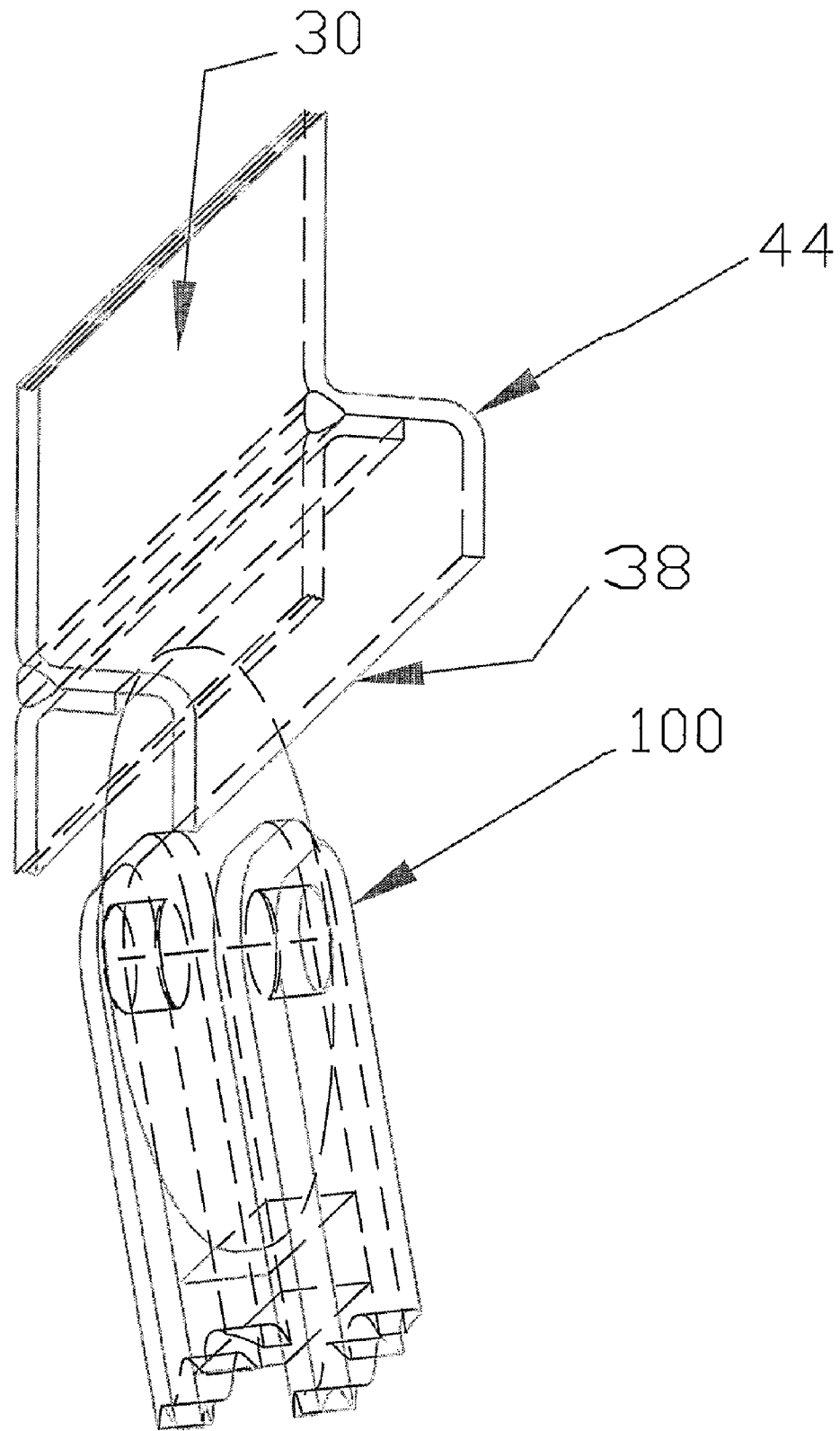

FIGS. 6a and 6b illustrate the roller track 160 formed by an adjacent "L" bend 42 and chair bend 44 of the unwelded upper and lower edges 36, 38 of metal sheet 30. As shown in these figures, the roller track 160 has two opposing roller track sides. The first roller track side is formed by the portion of metal sheet 30 that is continuous with bend 42 and upper edge 36. The opposing second roller track side is formed by an opposing vertical portion 48 that is continuous with the chair bend 44. As shown in FIGS. 11a and 11b and as discussed below, the space between the roller track sides accommodates one or more rollers that engage the roller track. By engaging the roller track these rollers support and rotate the tank wall as it is being constructed. In the preferred embodiment of the invention the first bend 42 forms an angle of between 45 and 135 degrees with the metal sheet 30 and has a width of between 5 and 100 mm, (depending on the thickness of the metal, the type of metal, and the size of the tank 10). In the preferred embodiment the second bend 44 has a horizontal portion 46 that is between 5 mm and 100 mm wide and a vertical portion 48 that is between 5 mm and 150 mm.

Referring to FIG. 5b, the roller track 160 (shown in isolation in FIGS. 6a-b) is supported underneath by roller 119 (on which the "L" bend along the upper longitudinal edge rests) while roller 118 pushes downwards (on the chair bend along the lower longitudinal edge).

Figure 8A:
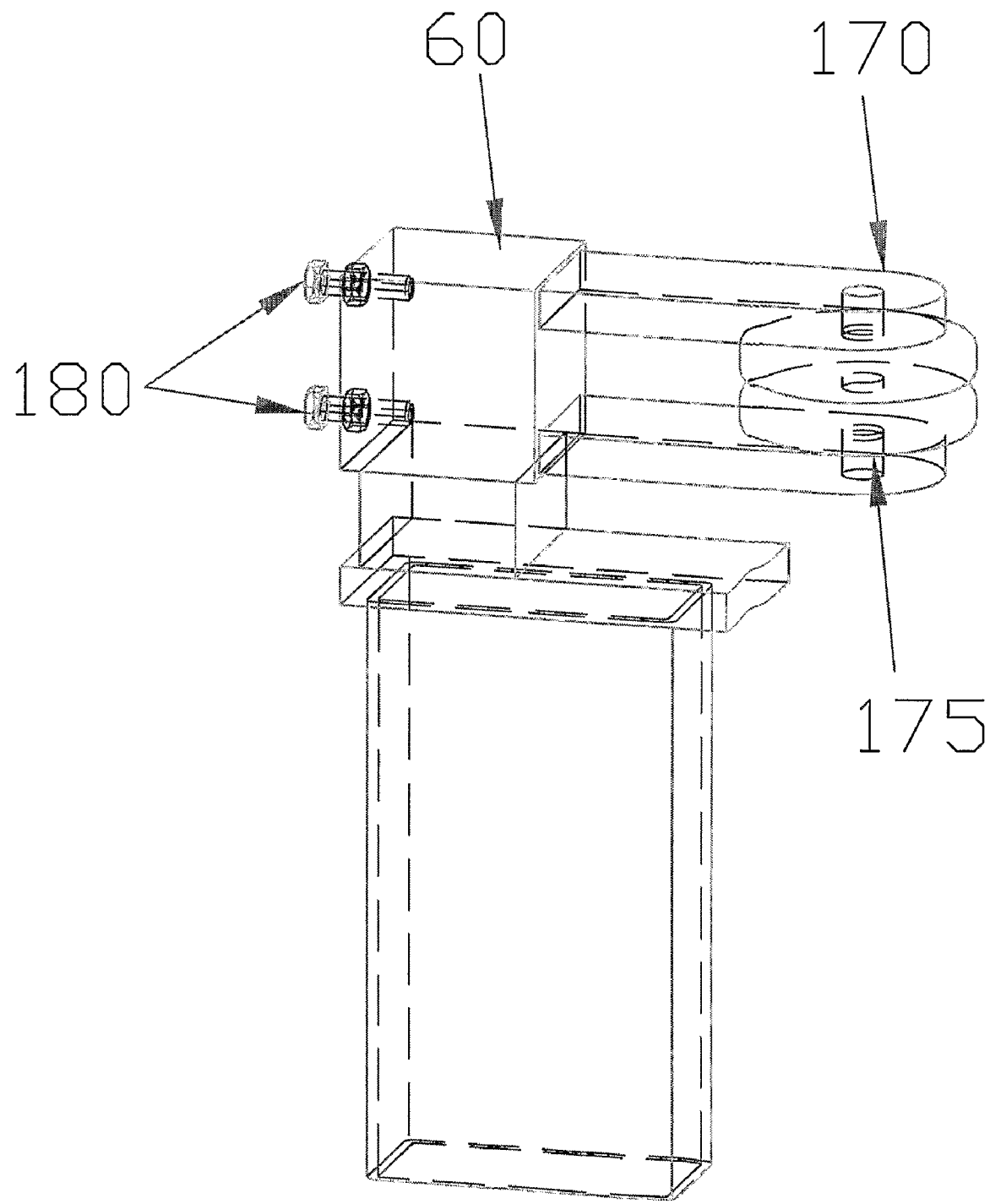
FIG. 8a shows a welding positioner.
Figure 8B:
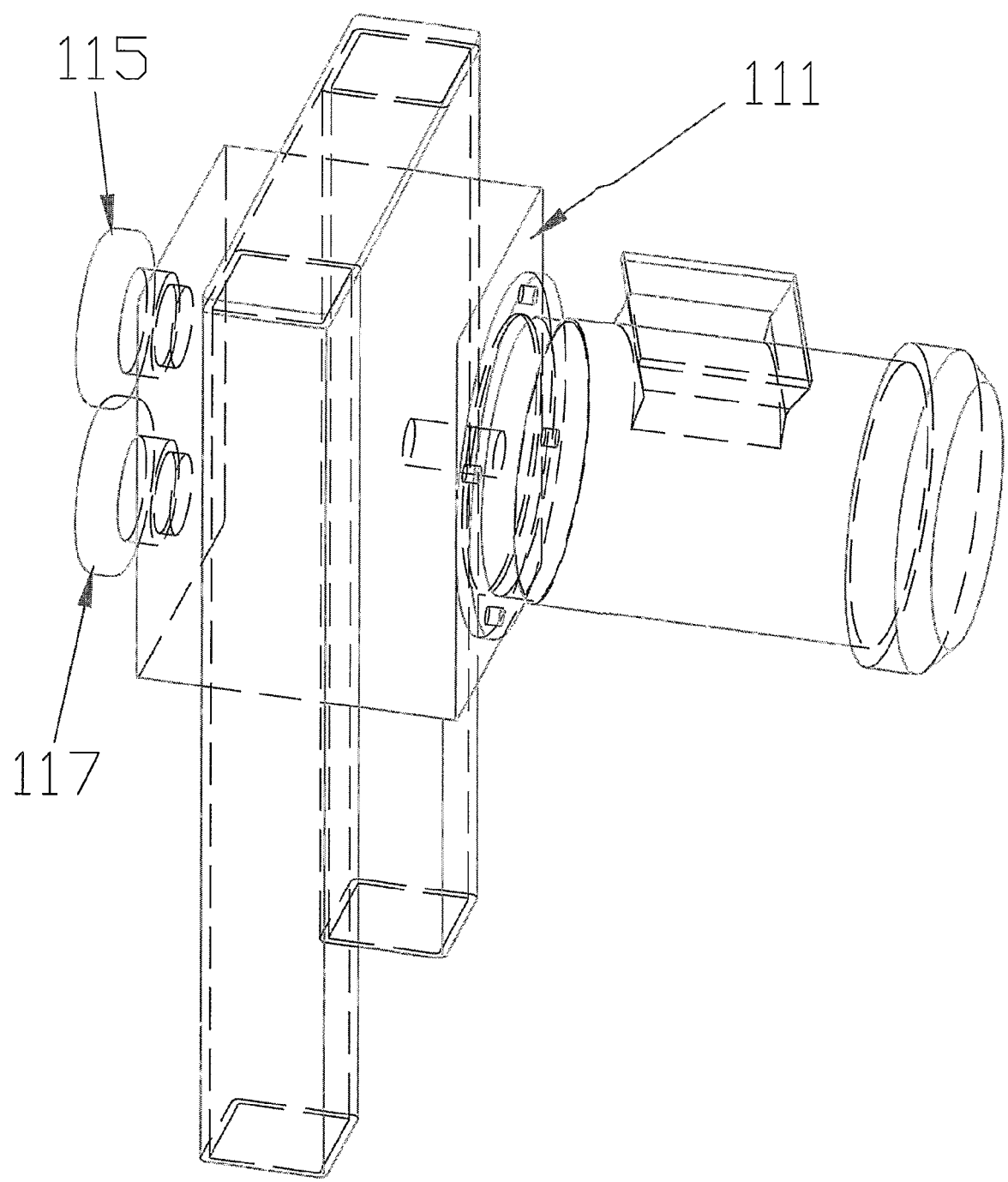
FIG. 8b shows a motorized double roller with adjustable bottom wheel.

FIGS. 7 & 8b show double roller 111 in isolation. Double roller 111 may also be used as part of a welding positioner 60. Double rollers 111 are motorized. In the preferred embodiment of the present invention the double rollers 110 (see FIGS. 1, 2 and 5*b*) of the welding pre-aligner 50 are also motorized to aid in the accurate positioning and welding of the metal sheet 30. In addition, in the embodiment in FIGS. 7 & 8*b*, the double roller 111 has rollers 115 and 117 that are adjustable. Rollers 115 and 117 can be simultaneously horizontally adjusted while the lower roller 117 can also be vertically adjusted upwards or downwards. Referring to FIGS. 7 and 8*b*, the roller track 160 (shown in isolation in FIGS. 6*a-b*) is supported underneath by roller 117 (on which the "L" bend along the upper longitudinal edge rests) while roller 115 pushes downwards (on the chair bend along the lower longitudinal edge).

Engagement of the track 160 by motorized double rollers 110 and/or 111 provides both support for the tank 10 as it is being constructed and means to advance the metal sheet 30 in a helical fashion.

FIG. 8*a* illustrates the welding positioner 60, operative to fine position the adjacent edges of the metal sheet 30 (not shown) for welding. Horizontal adjustable roller 170 pushes the lower edge of the upper part of metal sheet 30 in the exterior direction (i.e. from the inside of the tank 10 towards the outside) and roller 175 pushes the upper edge of the lower part of metal sheet 30 in the exterior direction. Adjustors 180 regulate the horizontal positioning of rollers 170, 175 and therefore the edges of the metal sheet.

Referring to FIGS. 4, 6*a-b*, 7, 9*a-b* and 11, it will be clear to those skilled in the art that the upper and lower longitudinal edges 36, 38 of the metal sheet 30 can be bent in a variety of configurations to create alternate track 160 shapes (e.g. non-right angle bends) which still permit the tank 10 to be moved and supported by, for example, engagement with double rollers 110 and/or 111, or single rollers 100. In addition, a variety of corrugation configurations may be used.

Figure 9A:
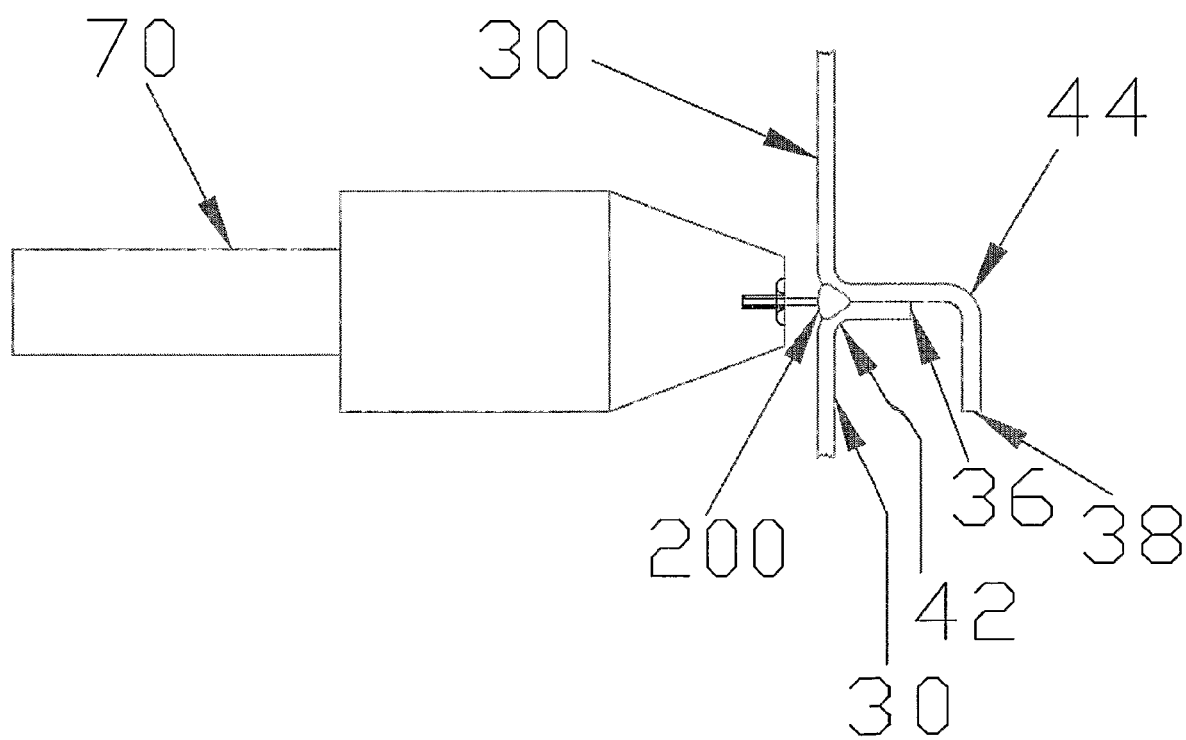
Figure 10:
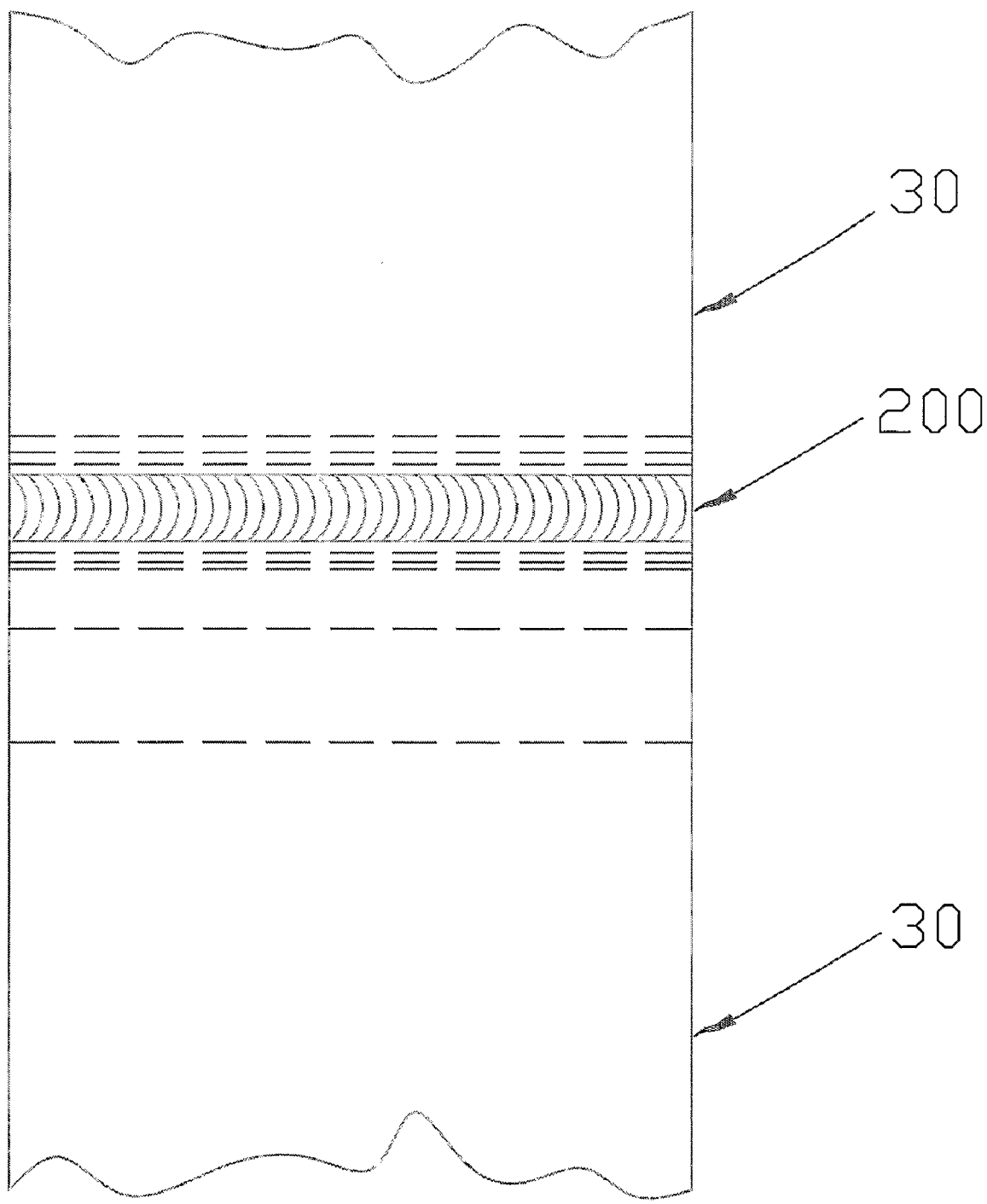
FIG. 10 shows a weld between adjacent loops of the metal strip as viewed from the inside of the tank.

FIGS. 9*a* and 9*b* illustrate a welder 70 applying a continuous weld 200 (e.g. fillet weld) to the groove between the "L" bend along the upper longitudinal edge 36 and a second "chair" bend along the lower longitudinal edge 38 of the metal sheet 30. FIG. 10 illustrates the weld 200 as viewed from the interior of the tank 10.

FIGS. 11*a* and 11*b* illustrate a welded roller track 160 engaged by a single roller 100. Single rollers 100 are used throughout the support system 80 (see FIG. 1) to support the tank 10 while allowing it to be easily rotated as the metal sheet 30 is welded and advanced in a helical fashion to produce the tank wall. As seen in the figures, the roller 100 is received between the roller track sides. Referring again to FIGS. 1*a*, 1*b* and 1*c*, the support system 80 may comprise as many or as few single rollers 100 and double rollers 110 & 111 as are deemed necessary depending on the height and size of the tank 10, and the size and thickness of the metal sheet 30.

Referring again to FIGS. 1*a*, 1*b* and 1*c*, the support system 80 may comprise as many or as few single rollers 100 and double rollers 110 & 111 as are deemed necessary depending on the height and size of the tank 10, and the size and thickness of the metal sheet 30.

Figure 12:
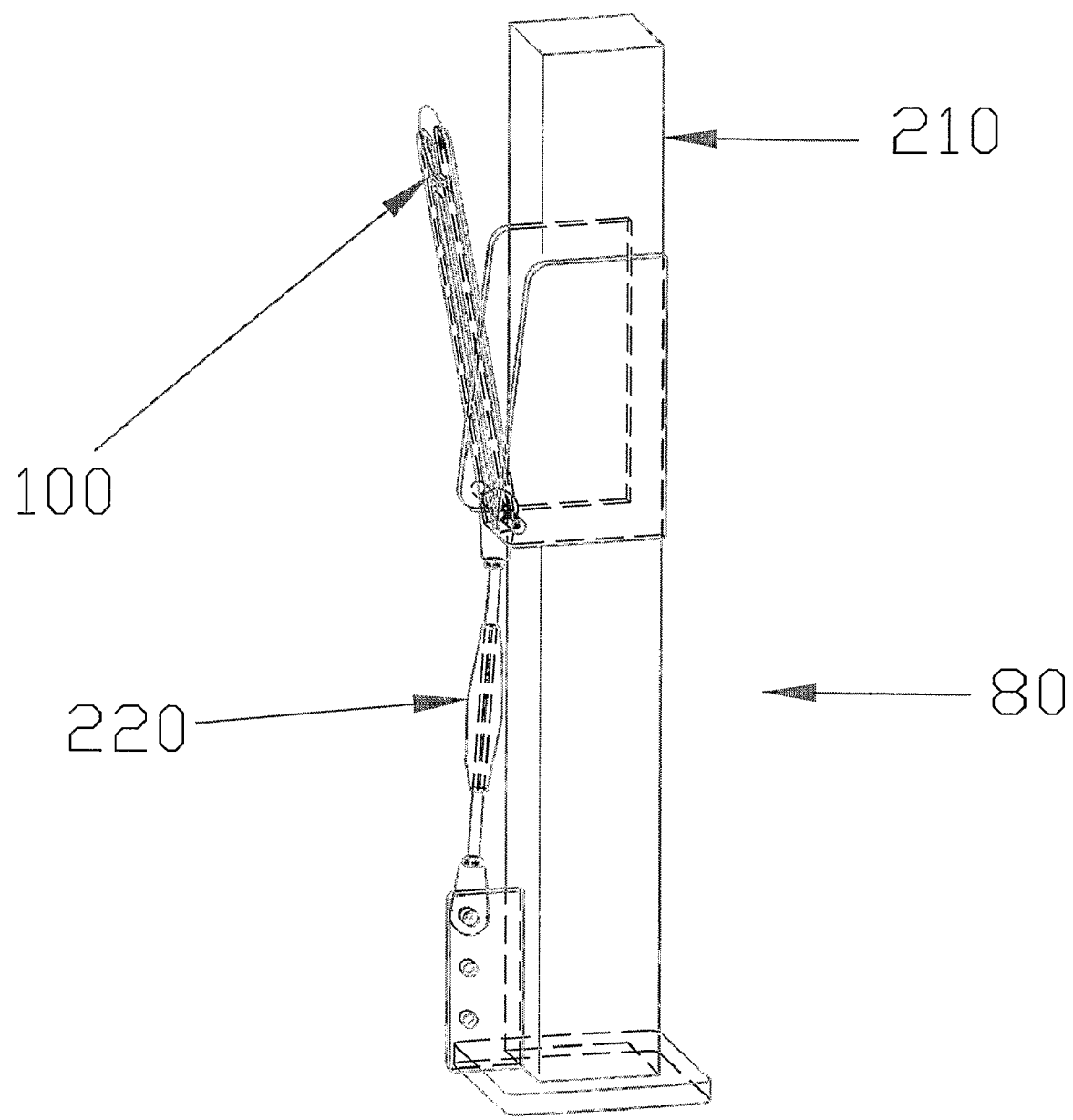
FIG. 12 shows a single free roller assembly.

FIG. 12 illustrates a single roller 100 supported by a support member 210 of the support system 80. Support members 210 and rollers 100, 110 and 111 such as these are arranged in a circular fashion (see FIG. 1) to support the tank 10 as it is being built. In the preferred embodiment of the invention the single rollers 100 are tiltable (i.e. the roller 100 can be tilted away from vertical alignment towards the centre of the tank 10 while maintaining contact with the roller track 160 (see FIG. 11) to maintain fine control of tank diameter. Further, in the preferred embodiment, the height of the single rollers 100 is adjustable (e.g. by a double threaded height adjuster 220) in order to provide control of the shape and incline of the helical winding of the metal sheet 30.

FIG. 13 illustrates a decoiler 20 that unwinds the coiled metal sheet 30 so that it can be incorporated into the tank.

Figure 14A:
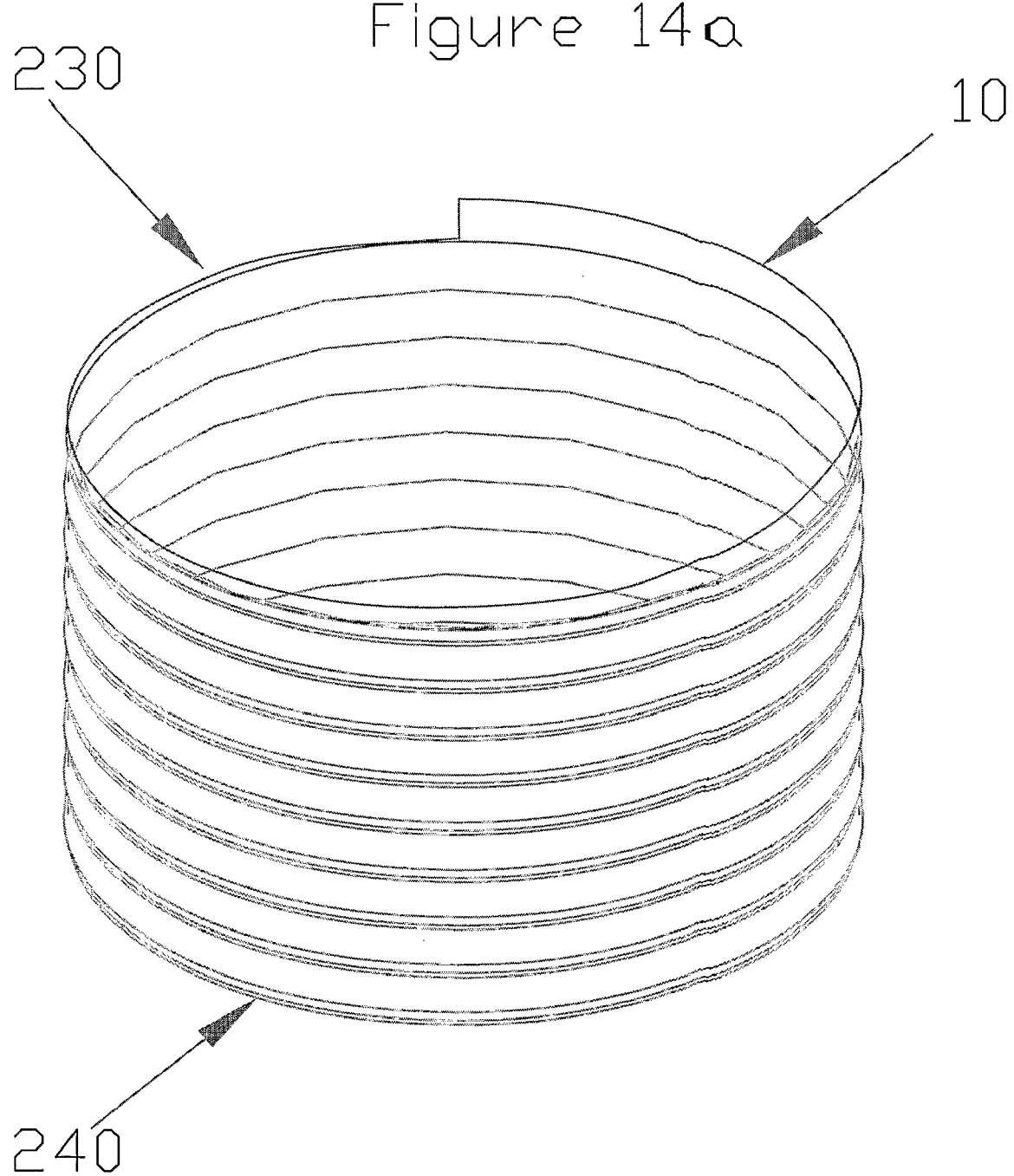
FIGS. 14a & 14b show the wall of a tank formed according to the present invention.
Figure 14B:
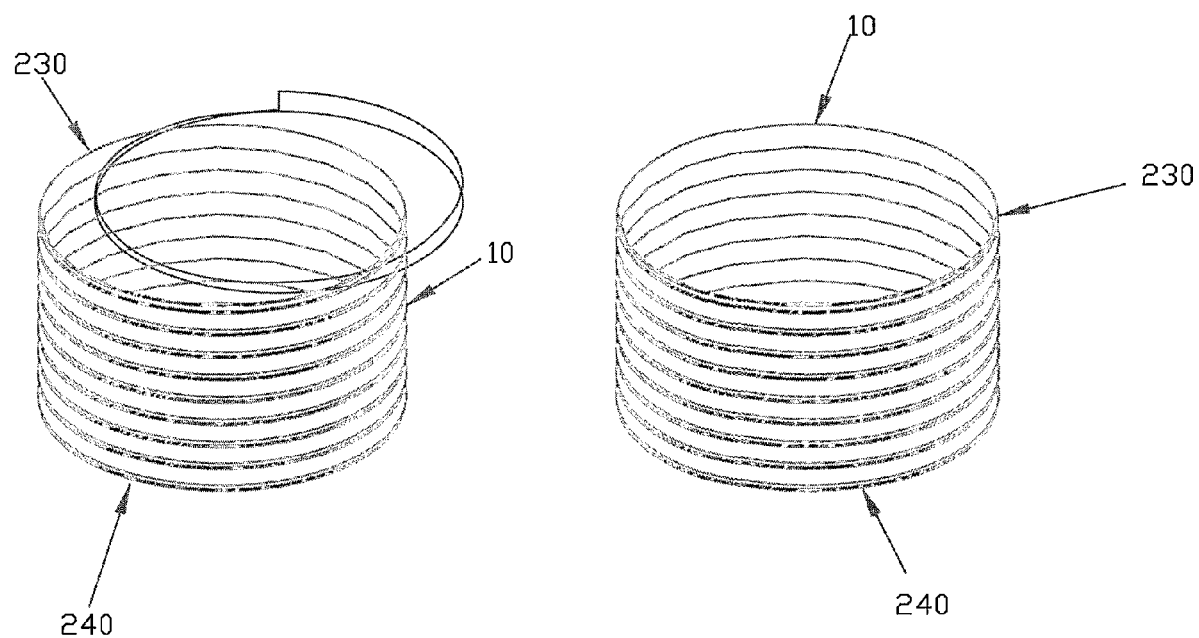

FIGS. 14*a* and 14*b* show the wall of a tank 10 produced according to the present invention from one or more helically wound metal sheets 30 welded continuously longitudinally and at vertical sheet-to-sheet seams. As more of the metal sheet 30 is added to the bottom of the tank 10, the tank is rotated about its longitudinal axis such that it advances gradually in an upward direction. The top edge 230 and the bottom edge 240 of the tank 10 in FIG. 14*a* are cut to form circumferential edges each lying in a plane parallel to the ground as shown in FIG. 14*b* (obviously, whether the circumferential edges are parallel to the ground or some other point of reference is a matter of design choice). After completion of the welding and cutting of the bottom edge 240, the tank can be lowered to the ground by reversing the rotation along the single and double rollers (see FIGS. 1 and 2). Any number of prior art techniques can be used to finish or cut the top edge 230 and the bottom edge 240 of the circular tank 10 and to weld and seal them to, for example, a concrete base.

SUMMARY

The invention disclosed herein may be conveniently summarized, at least in part, with reference to the following enumerated statements:

Statement 1. The invention includes a method for manufacturing a circular metal tank, comprising the steps of: providing an elongated sheet of metal; bending said sheet of metal along an upper longitudinal edge thereof to produce a first bend; bending said sheet of metal along a lower longitudinal edge thereof to produce a second bend; moving said sheet of metal in a helical trajectory such that said second bend comes into proximity above said first bend; welding said second bend to said first bend to form a wall of said tank, said wall having a continuous, helical weld; wherein said first and second bends cooperate to form a helical roller track on an outside of said tank; and wherein said tank is supported on a plurality of rollers that engage said roller track; and wherein said tank is rotated about its longitudinal axis on said rollers such that said tank moves upwards as said sheet of metal, is welded to a bottom thereof.

Statement 2. The invention includes the method of Statement 1 wherein said elongated sheet of metal is a coiled sheet of metal which is decoiled prior to said bending steps.

Statement 3. The invention includes the method of Statement 1 wherein said first bend is an "L"-bend and said second bend is a chair-bend.

Statement 4. The invention includes the method of Statement 1 wherein said metal sheet is corrugated before said welding step.

Statement 5. The invention includes the method of Statement 1 wherein prior to said welding step adjacent portions of said first and second bends are gross positioned and then fine positioned.

Statement 6. The invention includes the method of Statement 1 wherein at least one of said rollers is motorized and said tank and said metal sheet are moved by means of said motorized roller.

Statement 7. The invention includes the method of Statement 1 wherein said metal sheet is made of one of aluminum, galvanized steel, stainless steel, carbon steel.

Statement 8. The invention includes the method of Statement 1 wherein said first bend forms an angle of between 45 and 135 degrees with a body of said metal sheet.

Statement 9. The invention includes the method of Statement 1 wherein said first bend has a width of 5 mm to 100 mm.

Statement 10. The invention includes the method of Statement 1 wherein a width of a horizontal portion of said second bend is between 5 mm to 100 mm.

Statement 11. The invention includes the method of Statement 1 wherein a width of a vertical portion of said second bend is between 5 mm to 150 mm.

Statement 12. The invention includes the method of Statement 1 wherein a top of said tank is cut so as to create an upper circumferential edge which is parallel to the ground.

Statement 13. The invention includes the method of Statement 1 wherein a bottom of the tank is cut during operation to create a lower circumferential edge which is parallel to the ground.

Statement 14. The invention includes a system for manufacturing a circular metal tank, wherein the system comprises a decoiler for decoiling a coiled sheet of metal; a bender/corrugator for introducing a first bend along an upper longitudinal edge of said metal sheet and a second bend along a second longitudinal edge of said metal sheet; a support system having rollers for moving said metal sheet along a helical trajectory, supporting said tank and for rotating said tank about its longitudinal axis as said metal sheet is added to a bottom edge of said tank; a welding positioner for positioning said second bend proximate and above said first bend; a welder for welding said first and second bends together to form a circular wall of said tank; wherein said first and second bends cooperate to form a helical roller track on an outside of said tank; and wherein said tank is supported on said rollers that engage said roller track.

Statement 15. The invention includes the system of Statement 14 further comprising a vertical coil seam welder for butt-welding an end of a first coiled metal sheet to an end of a second coiled metal sheet before said metal sheet pass through said bender/corrugator.

Statement 16. The invention includes the system of Statement 14 further comprising a welding pre-aligner for gross positioning said first and second bends before said first and second bends are positioned by said welding positioner.

Statement 17. The invention includes the system of Statement 14 wherein said first bend is an "L"-bend and said second bend is a chair-bend.

Statement 18. The invention includes the system of Statement 14 wherein said bender/corrugator additionally corrugates said metal sheet.

Statement 19. The invention includes the system of Statement 14 wherein at least one of said rollers is motorized and said tank and said metal sheet are moved by means of said motorized roller.

Statement 20. The invention includes the system of Statement 14 wherein said metal sheet is made of one of aluminum, galvanized steel, stainless steel, carbon steel.

Statement 21. The invention includes the system of Statement 14 wherein said first bend forms an angle of between 45 and 135 degrees with a body of said metal sheet.

Statement 22. The invention includes the system of Statement 14 wherein said first bend has a width of 5 mm to 100 mm.

Statement 23. The invention includes the system of Statement 14 wherein a width of a horizontal portion of said second bend is between 5 mm to 100 mm.

Statement 24. The invention includes the system of Statement 14 wherein a width of a vertical portion of said second bend is between 5 mm to 150 mm.

Statement 25. The invention includes the system of Statement 14 further comprising means for cutting a top of said tank so as to create an upper circumferential edge which is parallel to the ground.

Statement 26. The invention includes the system of Statement 14 further comprising means for cutting a bottom of the tank to create a lower circumferential edge which is parallel to the ground.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

I claim:

1. A method for manufacturing a circular metal tank wall from an elongate metal sheet, wherein said metal sheet has an upper edge, said method comprising the steps of:
   (a) providing the elongated metal sheet;
   (b) bending the upper edge of the metal sheet to produce an upper bend along the upper edge;
   (c) bending a lower edge of the metal sheet produce a lower bend along the lower edge;
   (d) aligning the lower bend into proximity with the upper bend;
   (e) welding the upper edge of the metal sheet to the lower edge of the metal sheet to form the circular tank wall, wherein the upper bend and the lower bend of the metal sheet cooperate to form a roller track, and wherein the roller track has two opposing roller track sides spaced apart to accommodate rollers that can engage the roller track and support the tank wall as it is being constructed; and,
   (f) rotating the tank wall about its longitudinal axis on the rollers such that the tank wall moves upwards as Step (d) and Step (e) are performed.

2. The method of claim 1, wherein the elongated metal sheet provided at Step (a) is coiled, and wherein Step (a) comprises the step of decoiling the metal sheet.

3. The method of claim 1, wherein the metal sheet is corrugated prior to Step (e).

4. The method of claim 1, wherein Step (d) comprises the steps of:
   (d1) gross positioning the upper and lower bends; and,
   (d2) fine positioning the upper and lower bends.

5. The method of claim 1, wherein at least one of the rollers is motorized and wherein Step (f) is performed by using the motorized rollers.

6. The method of claim 1, wherein the metal is one of aluminum, galvanized steel, stainless steel, and carbon steel.

7. The method of claim 1, wherein a first one of the roller track sides is the tank wall and wherein a second one of the roller track sides is formed from an opposing vertical portion of the lower bend.

8. The method of claim 1, further comprising the step of cutting an upper edge of the tank wall to create an upper circumferential tank edge that is substantially parallel to the ground.

9. The method of claim 1, further comprising the step of cutting a lower edge the tank wall to create a lower circumferential tank edge that is substantially parallel to the ground.

10. A circular metal tank wall manufactured according to the method of claim 1.

11. A tank comprising the circular metal tank wall of claim 10.

12. A system for manufacturing a circular metal tank wall from an elongate metal sheet, said system comprising:
   a. at least one bender/corrugator, wherein said bender/corrugator bends an upper edge of the metal sheet one or more times to produce an upper bend and wherein said bender/corrugator bends a lower edge of the metal sheet one or more times to produce a lower bend;
   b. a welder used to weld the upper edge of the metal sheet and the lower edge of the metal sheet together, wherein the upper bend and the lower bend cooperate to form a roller track when the upper edge of the metal sheet and the lower edge of the metal sheet are welded, wherein the roller track has two opposing track sides; and,
   c. a plurality of rollers that are received between the roller track sides, wherein the tank wall is supported by said rollers when they are received between the roller track sides, and wherein the tank wall rides on said rollers when the tank wall is rotated about its longitudinal axis.

13. The system of claim 12 wherein one bend produced by said bender is a chair-bend.

14. The system of claim 12 wherein one bend produced by said bender is an "L"-bend.

15. The system of claim 12, further comprising a decoiler used to decoil a coil of the elongate metal sheet prior to bending the upper and lower edges of the metal sheet.

16. The system of claim 12, wherein the upper bend produced by said bender has an angle of between 45 and 135 degrees with the metal sheet.

17. The system of claim 12, wherein the bends produced by said bender cooperate to produce a spacing of 5 mm to 100 mm between the roller track sides.

18. The system of claim 12, further comprising a corrugator used to corrugate the metal sheet.

19. The system of claim 12, wherein at least one of said rollers is motorized, and wherein said motorized roller causes rotation of the tank about a longitudinal axis of the tank as the tank is constructed.

20. The system of claim 12, further comprising a positioner, wherein said positioner is used to align the upper bend proximate the lower bend for welding the upper and lower edges of the metal sheet together.

21. The system of claim 20, further comprising a welding pre-aligner, wherein said pre-aligner is used to gross position the upper and lower bends before the upper and lower bends are aligned by said positioner.

22. The system of claim 12, further comprising a vertical coil seam welder, wherein said vertical coil seam welder is used to butt-weld an end of a first metal sheet to an end of a second metal sheet.

* * * * *